Jan. 16, 1940.  J. W. JOHNSTON  2,187,204
GRADING MACHINE
Filed May 19, 1933  12 Sheets—Sheet 1
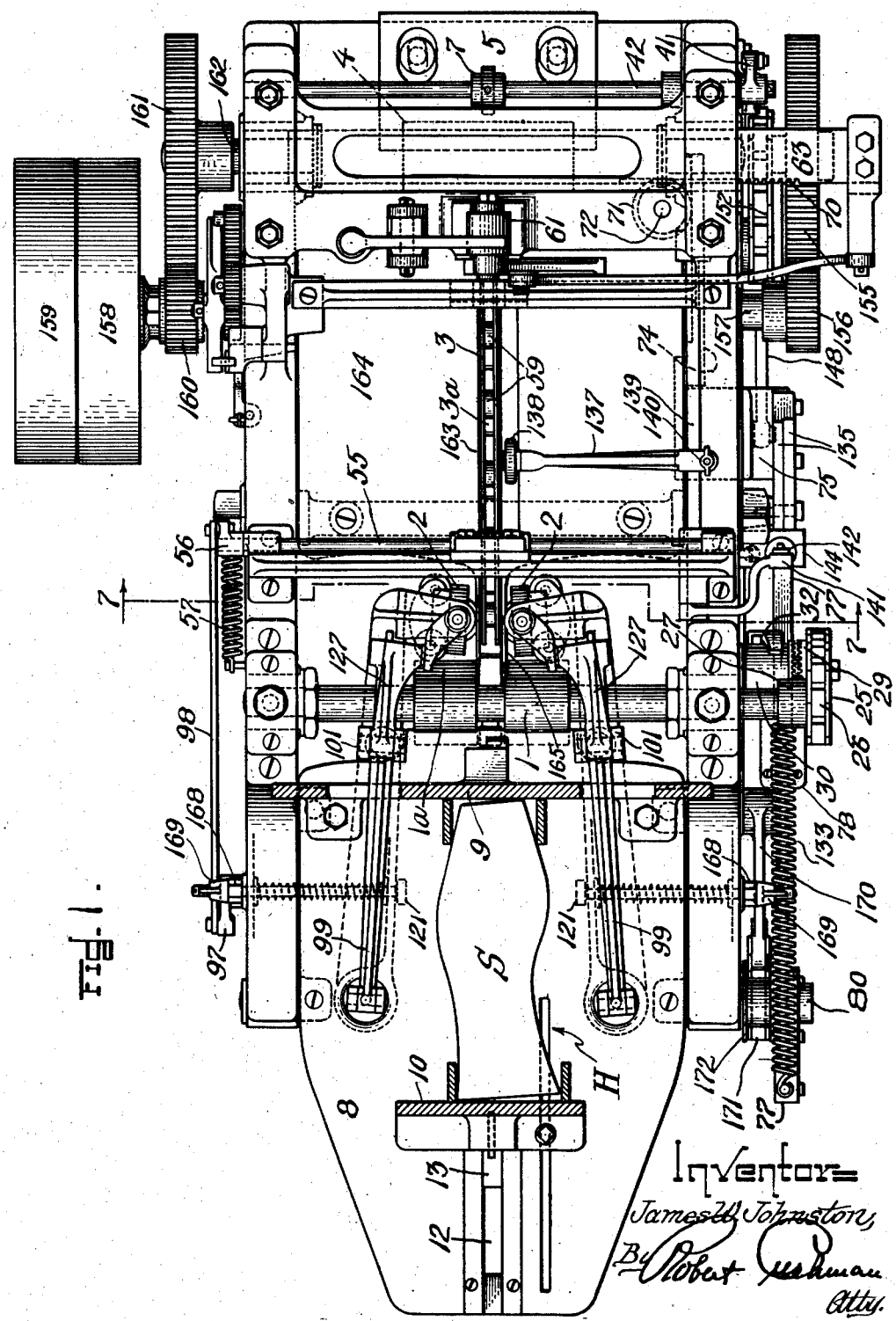
Inventor:
James W. Johnston,
By Robert Cushman
Atty.

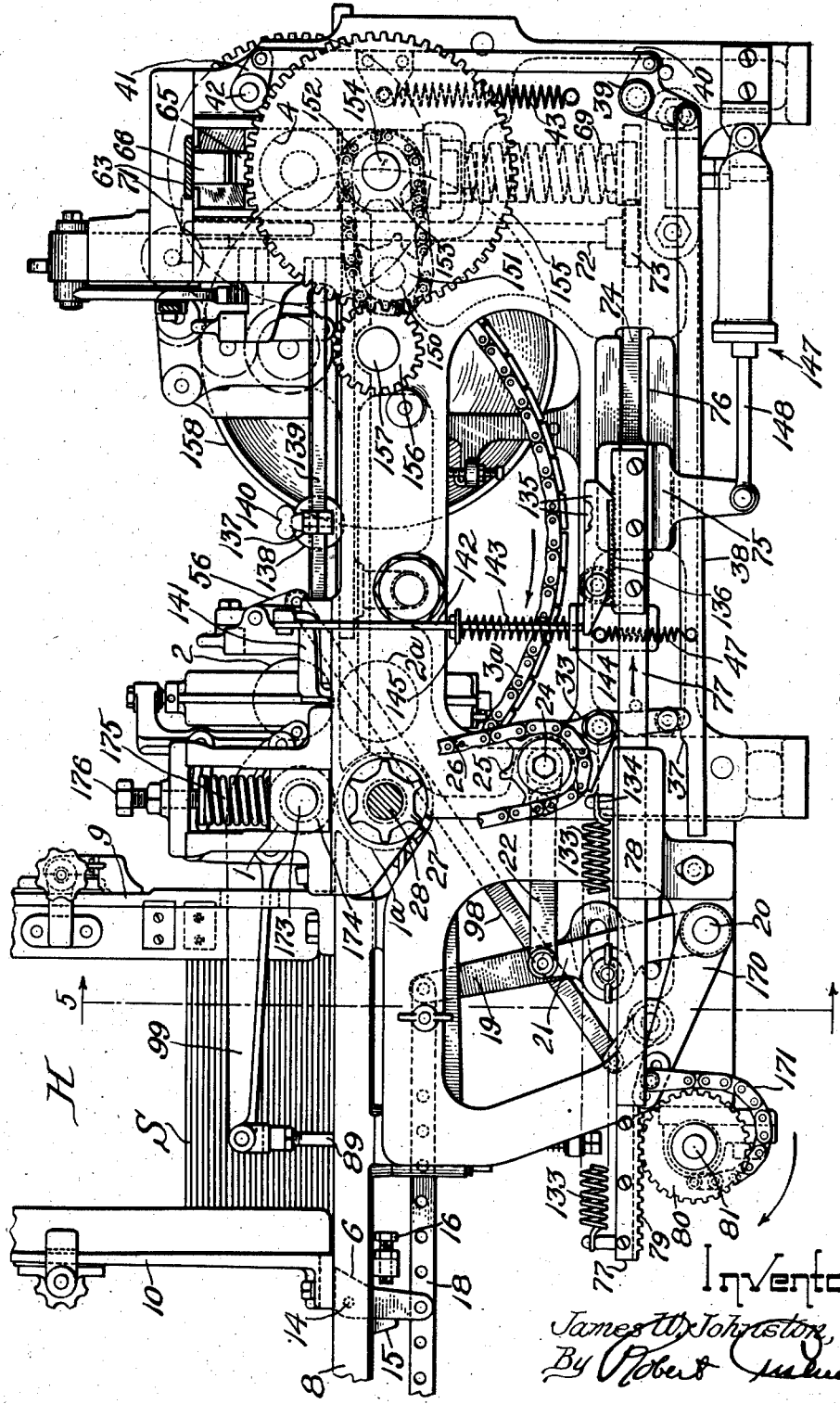

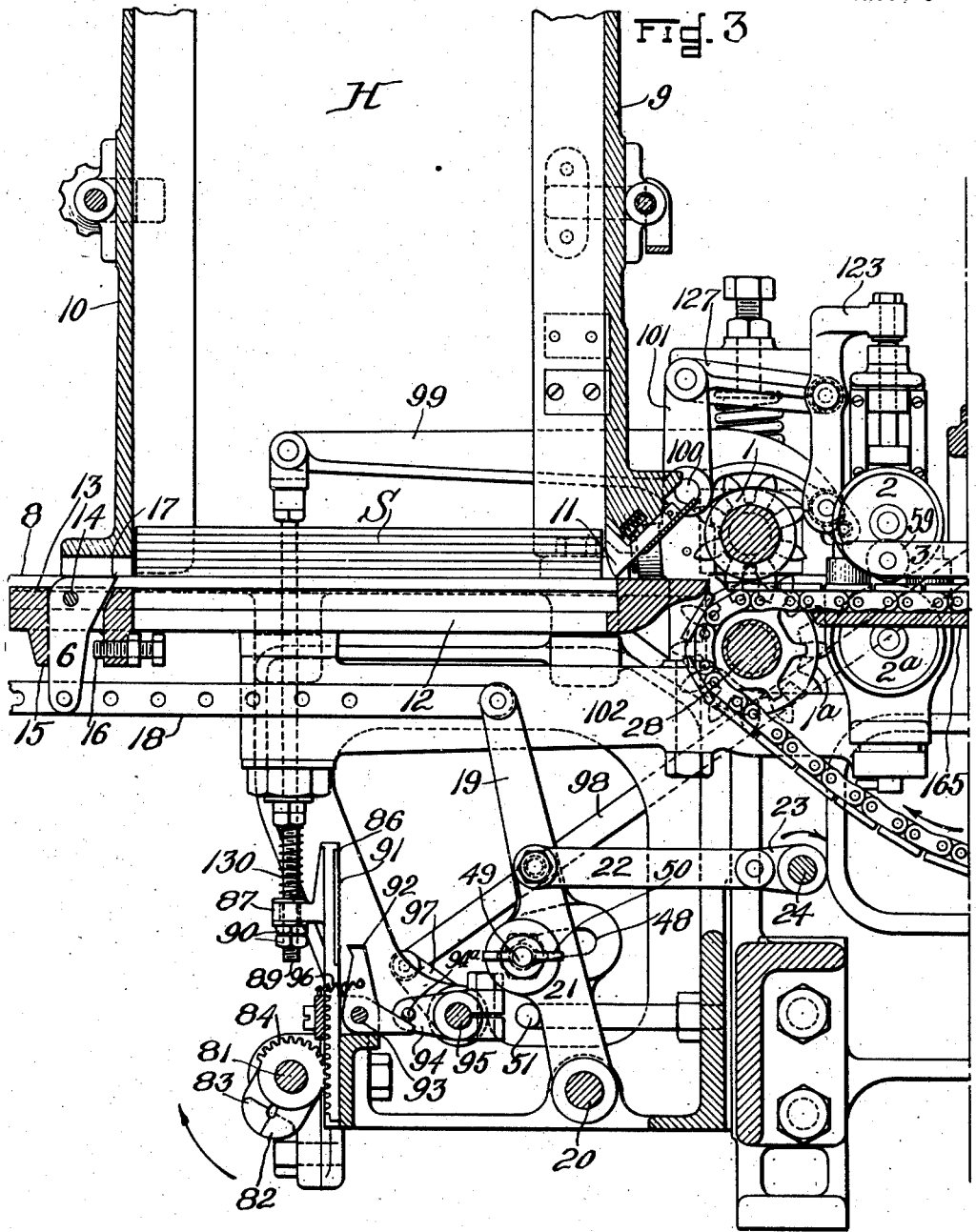

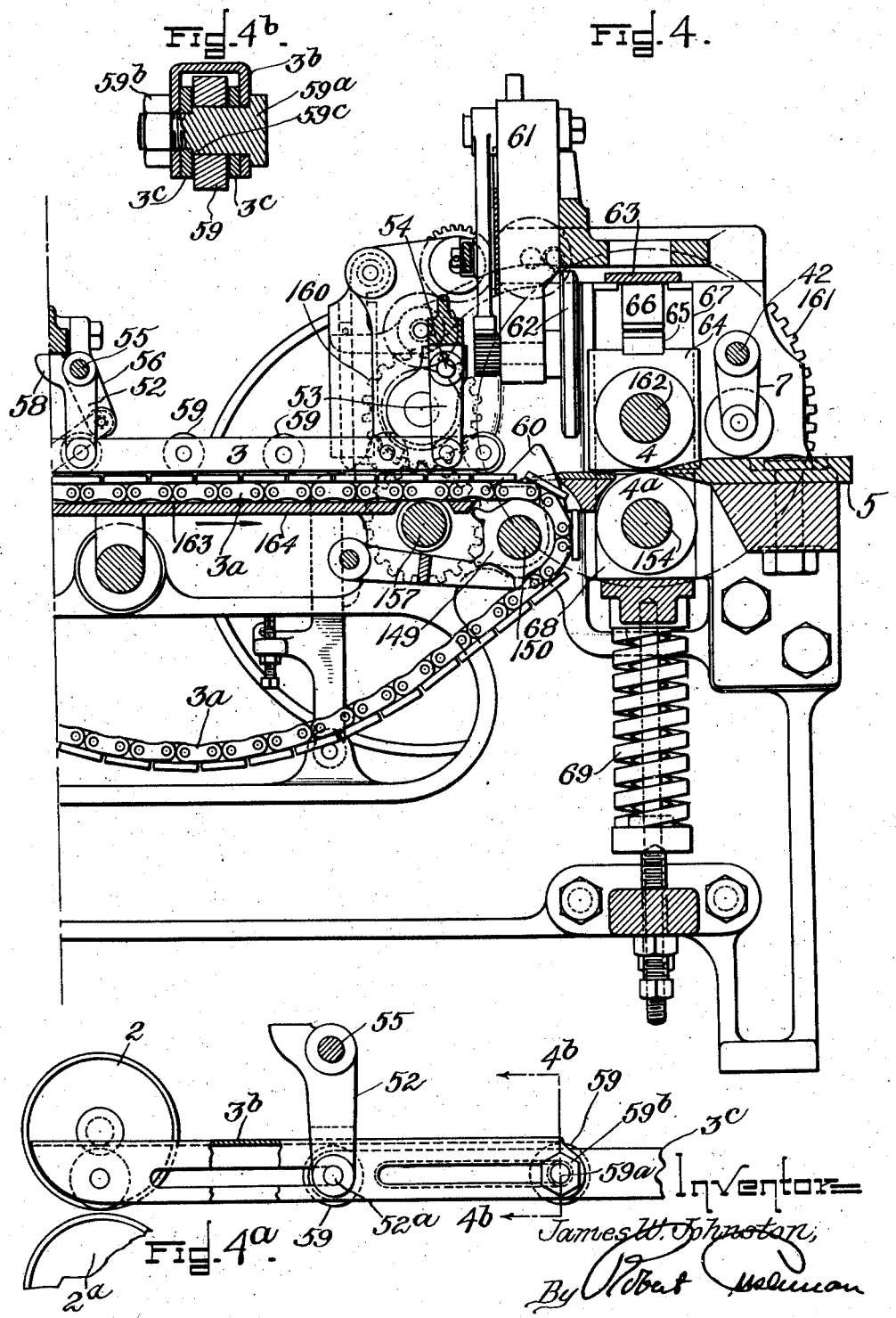

Jan. 16, 1940.　　　　J. W. JOHNSTON　　　　2,187,204
GRADING MACHINE
Filed May 19, 1933　　　12 Sheets-Sheet 5

Inventor=
James W. Johnston,
By Robert Cushman
Atty.

Jan. 16, 1940.　　　J. W. JOHNSTON　　　2,187,204
GRADING MACHINE
Filed May 19, 1933　　　12 Sheets-Sheet 6
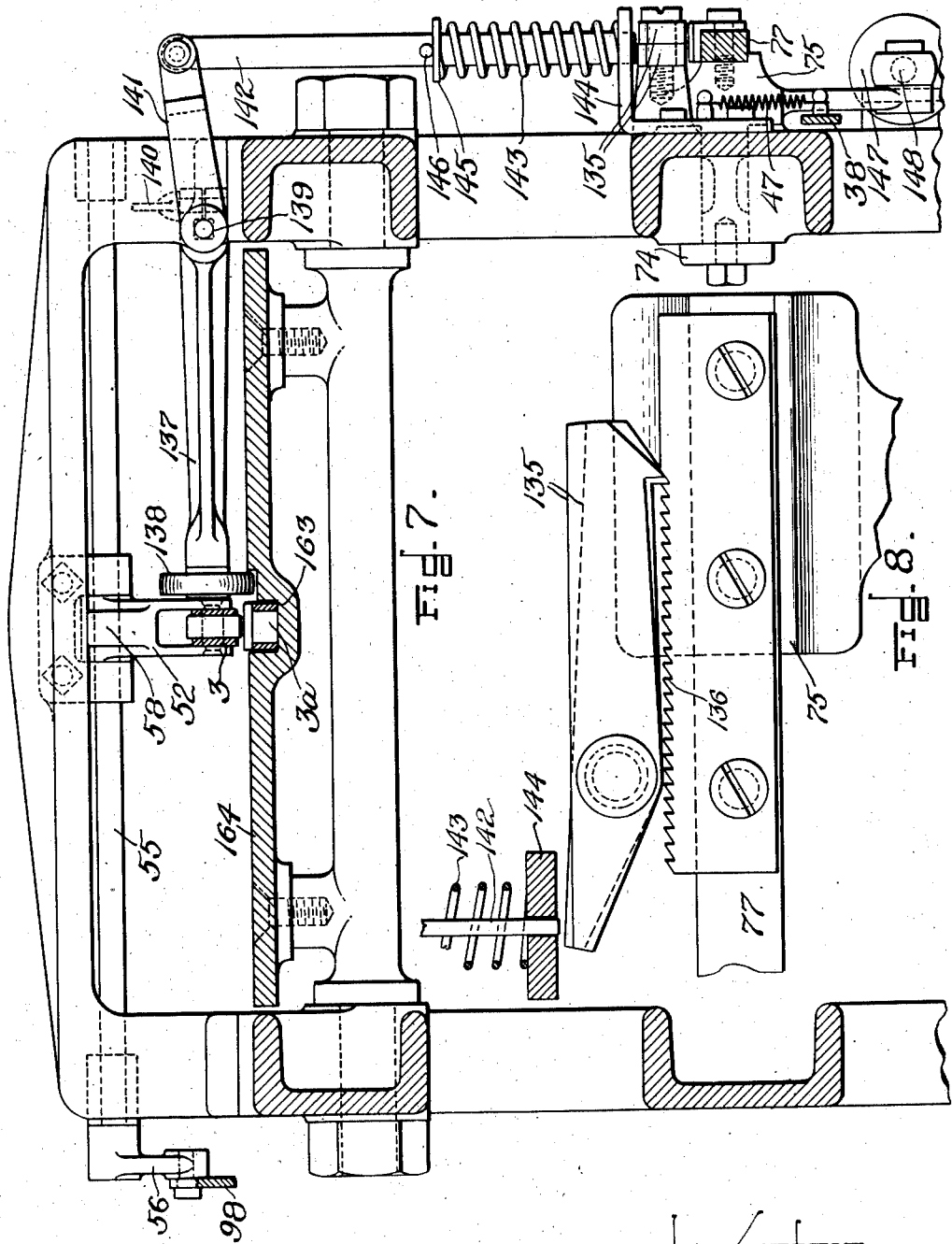

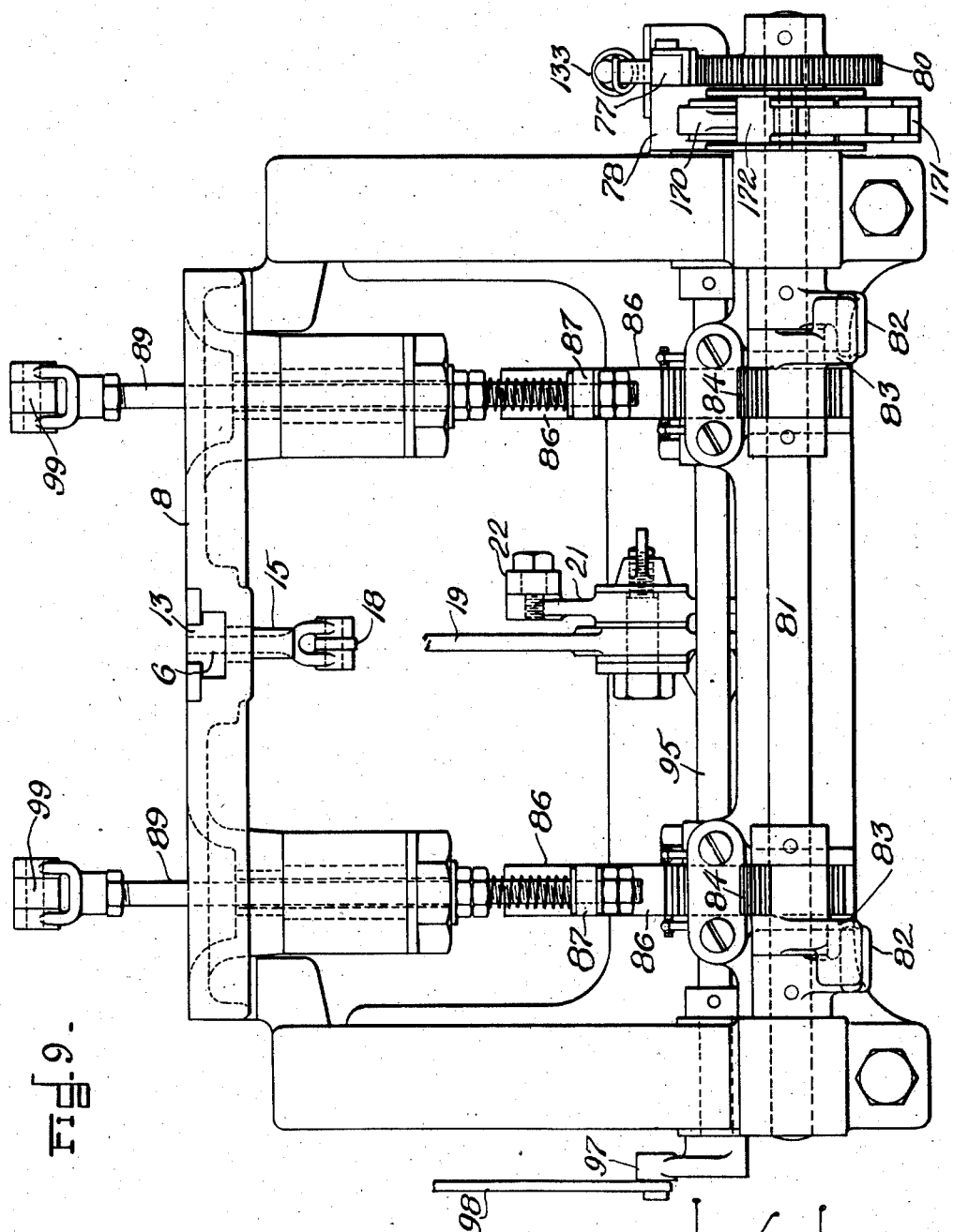

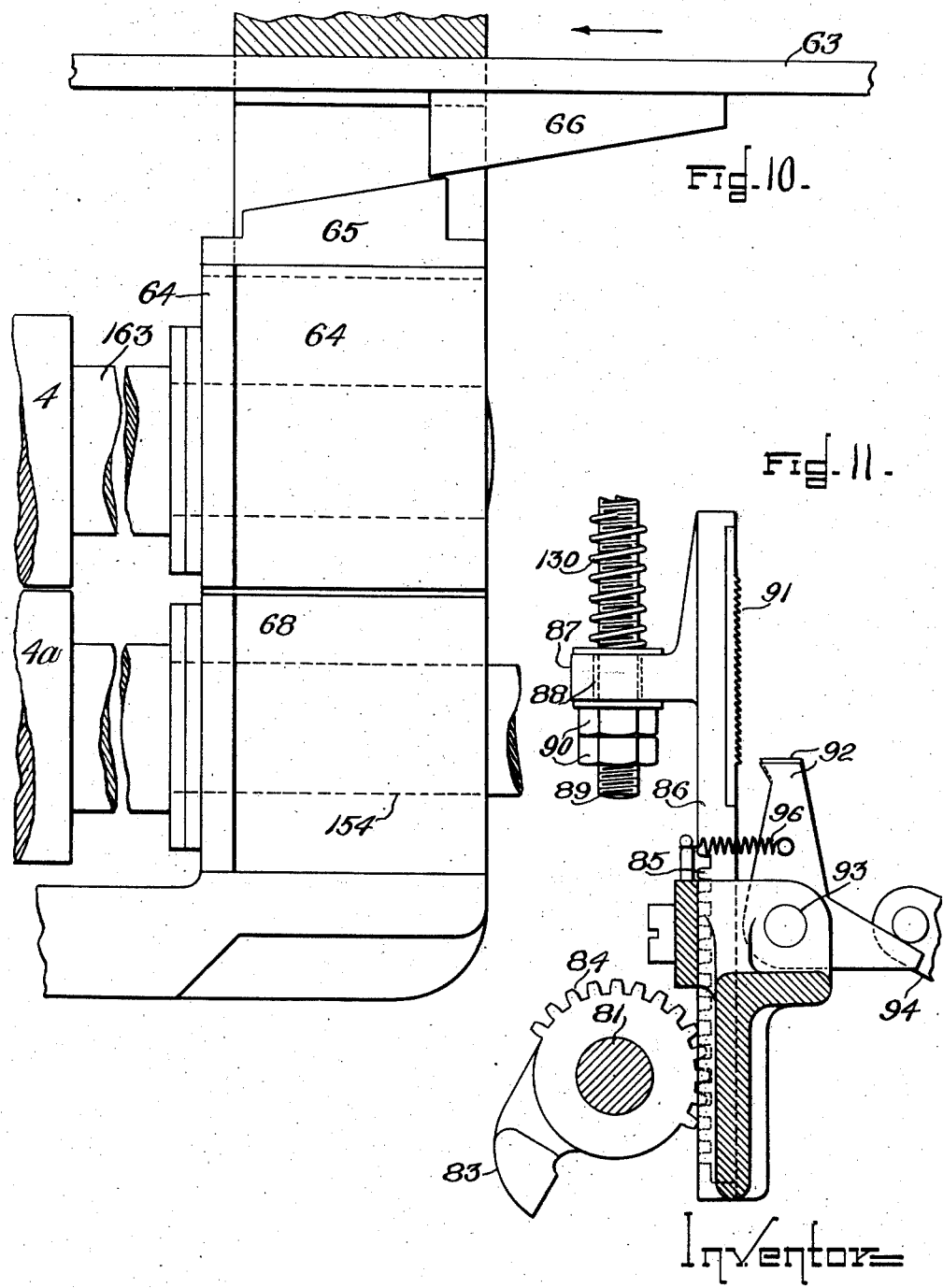

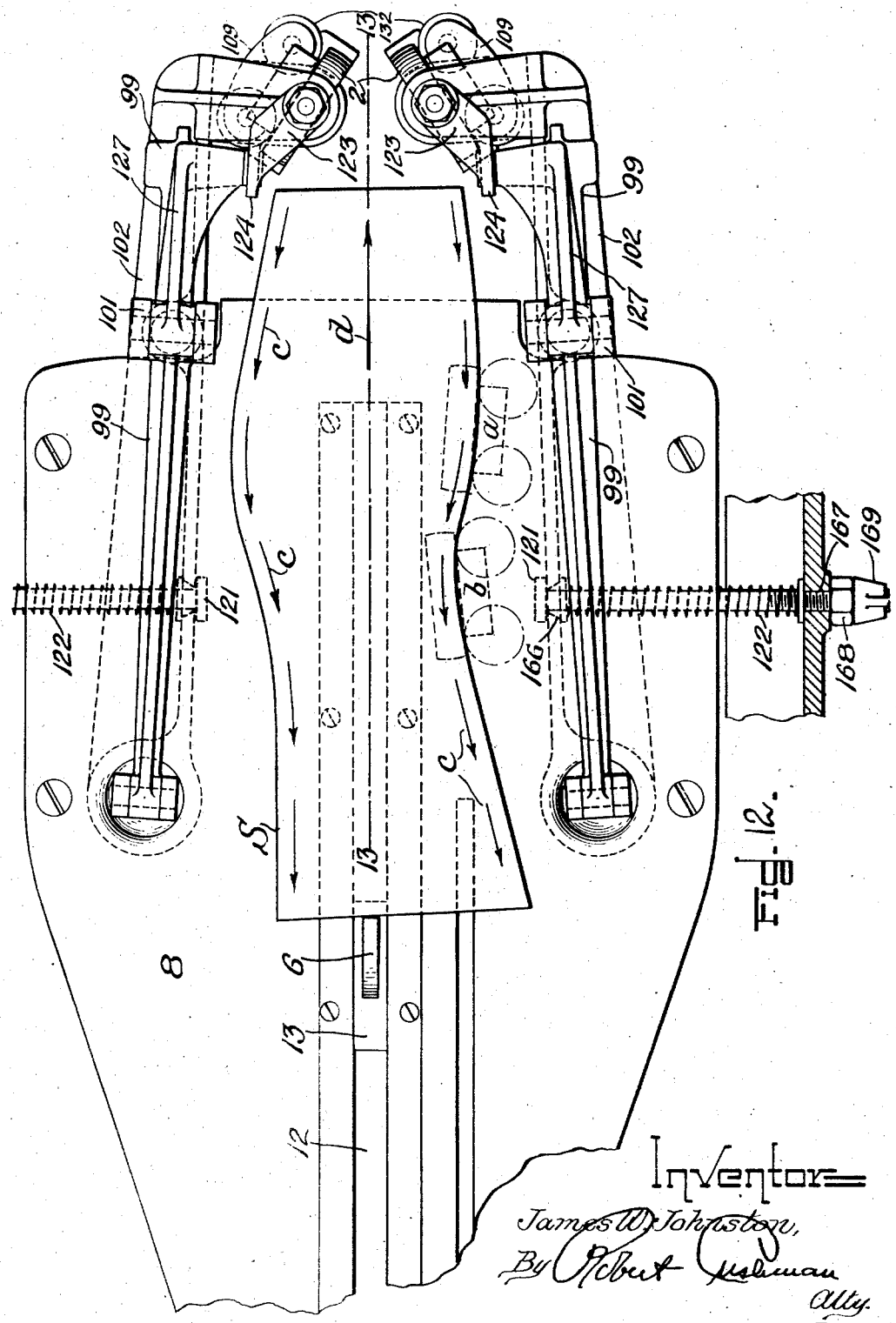

Jan. 16, 1940. J. W. JOHNSTON 2,187,204
GRADING MACHINE
Filed May 19, 1933 12 Sheets-Sheet 10
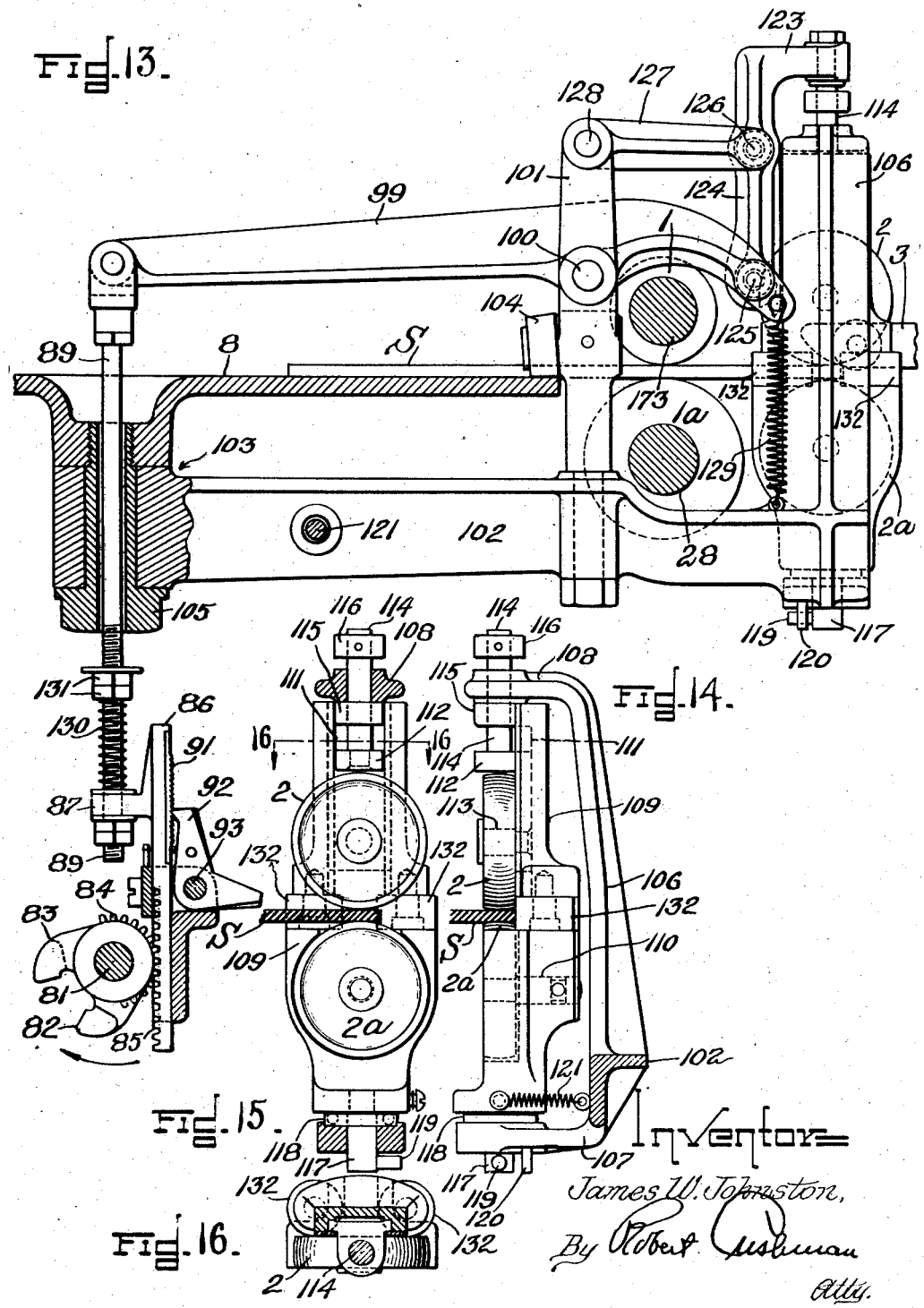

Jan. 16, 1940.   J. W. JOHNSTON   2,187,204
GRADING MACHINE
Filed May 19, 1933   12 Sheets-Sheet 11

Inventor=
James W. Johnston,
By Robert Milman
Atty.

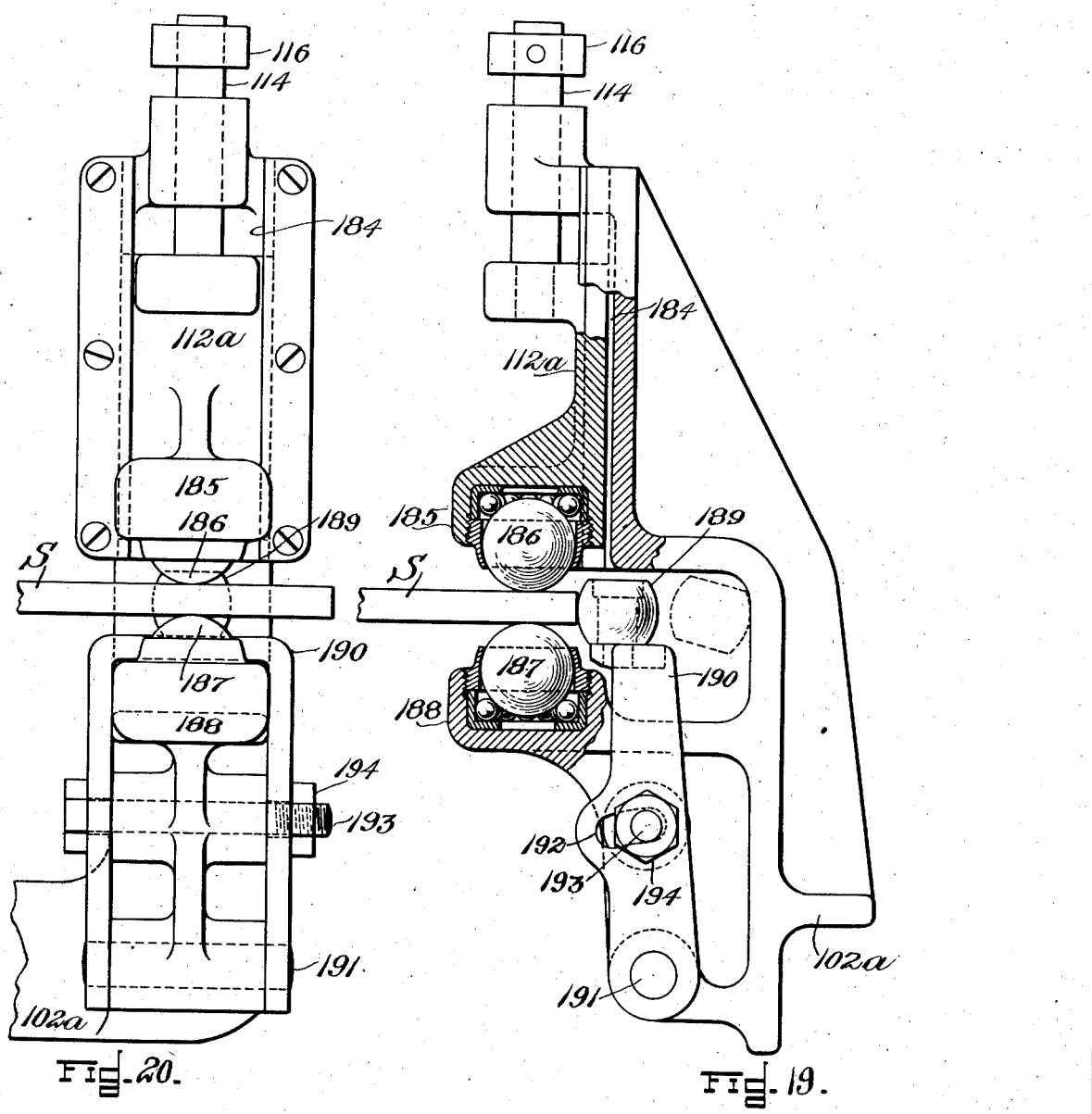

Patented Jan. 16, 1940

2,187,204

UNITED STATES PATENT OFFICE 2,187,204

GRADING MACHINE

James W. Johnston, Manchester, N. H., assignor to North American Holding Corporation, Syracuse, N. Y., a corporation of New York Application May 19, 1933, Serial No. 671,865

46 Claims. (Cl. 69—11)

This invention relates to grading machines of the kind which grade shoe soles, taps and other blanks of stock used in the manufacture of shoes, and more particularly to the well-known Nichols type of grading machines illustrated in a series of patents granted to Elmer P. Nichols and Leander A. Cogswell, of which the Nichols Patent No. 1,130,321, dated March 2, 1915, may be referred to as an example. A characteristic feature of such grading machines is that each blank is measured and graded in accordance with the thickness of the thinnest spot of the blank, or of a selected area of the blank, as determined by the detecting and measuring device.

There are various kinds of grading operations performed by various species of grading mechanisms, and the term grading, established in this art, is a generic term and includes evening or skiving the blank as a whole down to the grade or thickness of its thinnest spot, stamping or marking each blank with a character indicating its thickness grade, indicating on a visual indicator the grades of the several blanks, and sorting or distributing the blanks in accordance with their grade measurements. Two or more species of grading mechanisms may be and commonly are contained in one machine and the term grading is used herein in its generic sense unless some particular kind of grading is specified.

Whatever may be the kind or kinds of grading to be performed the appropriate grading mechanism or mechanisms are adjusted through setting and transmission mechanisms in response to and in accordance with the thickness grade of each blank as determined by the detecting and gauging or measuring device, which acts on each blank as successive blanks are passed one by one through the machine. The measurements are usually made in terms of "irons" (⅛ of an inch), and the measurement transmitted to the grading devices is usually the thickness measurement in irons or fractions of irons, which is nearest to but not greater than the thickness of the thinnest part of the blank as determined by the measuring device. In the machine herein illustrated two species of grading mechanisms are shown, namely, an evening or skiving mechanism and a stamping or marking mechanism; but it will be understood that additional or different species of grading mechanisms might be used, such as visual indicators or distributors, and are within the scope of the claims unless specifically restricted to some particular species of grading mechanism.

The present invention has to do particularly with the detecting and gauging or measuring mechanism, and the setting and transmission mechanisms by which the grading mechanism is controlled in accordance with the findings of the measuring mechanism. Other features and combinations will be hereinafter described and pointed out in the claims.

In boot and shoe making it is desirable, and indeed well-nigh essential for the best results, that in the completed shoe the exposed edge of the sole or tap be of substantially uniform thickness, especially at the opposite side edges of the forepart. Consequently it is the thickness of the marginal area especially along the side edges of a sole which should determine the thickness grade of the sole, and to which thickness the sole as a whole should be evened or skived down.

Heretofore the detecting and measuring mechanism of grading machines has comprised a pair of cylindrical rolls between which the sole or other blank passed. One roll moved yieldingly toward and from the other as thinner and thicker areas of the blank were encountered and the grading devices were responsive to this detecting motion. These rolls usually extended completely across the blank and engaged opposite surfaces of the blank substantially from edge to edge, with the result that if the blank had a relatively thin side marginal portion that portion might not be detected by the rolls since the rolls might be held apart by a thicker area in the interior or at the opposite side margin of the blank. Attempts have been made partially to correct this defect by dividing one or both of the detecting rolls into two parts, separated or spaced apart at the middle, so that the rolls would not be affected by a path or region extending lengthwise along the middle of the blank of a width corresponding to the spacing between the roll sections. See, for example, the Nichols Patent No. 1,582,140, dated April 27, 1926, and the Cogswell Patent No. 1,726,610, dated September 3, 1929. This expedient, although an improvement, was open to the same objections (less only in degree) as the continuous rolls. The two spaced roll sections each traversed a straight path on the blank and, when operating on a curved or irregular blank like a cut sole, instead of following a marginal path of uniform width traversed an area at the side of the blank varying in width from a very narrow area or a mere point to a breadth at the widest part of the blank greatly in excess of the marginal region which determines the proper grade of the blank. Moreover, the two roll sections were mounted on a single shaft common to both so that neither section could act wholly independently of the other to gauge its adjacent margin uninfluenced by the other.

One of the principal objects of the present invention is to provide measuring mechanism which which will measure only the side marginal portions of the blank, and will follow the contour of a blank having an irregular or non-rectilinear side edge and therefore measure a marginal area of substantially uniform breadth irrespective of the edge contour of the blank, the measuring or calipering device at each edge of the blank being independent of the other and indifferent to the thickness of the interior portion or the opposite side marginal portion of the blank. Thus the thickness detecting and measuding or calipering is performed upon and confined to the precise marginal area of the blank which is determinative of the grade of the blank, and since the two calipering devices at opposite margins of the blank are independent of each other, and since the adjustable grading means controlled thereby is responsive to both of said independently operated calipering devices, by which is meant that the grading means is adapted and ready to respond to either of said calipering devices if a sufficiently thin area of the blank is encountered by either to affect the grading means, and since the final adjustment of the grading means will accord with that one of the two calipering devices which measures the thinnest area of the blank as determined by either calipering device, it follows that the blank will be graded in accordance with the thickness of the thinnest spot as determined by either calipering device. In its broader aspects the invention might be applied to other instruments than calipering instruments, for acting only upon the margin of the blank.

In the accompanying drawings:

Fig. 1 is a plan view of a grading machine constructed in accordance with this invention;

Fig. 2 is a side elevation of the machine shown in Fig. 1;

Figures 5, 6:
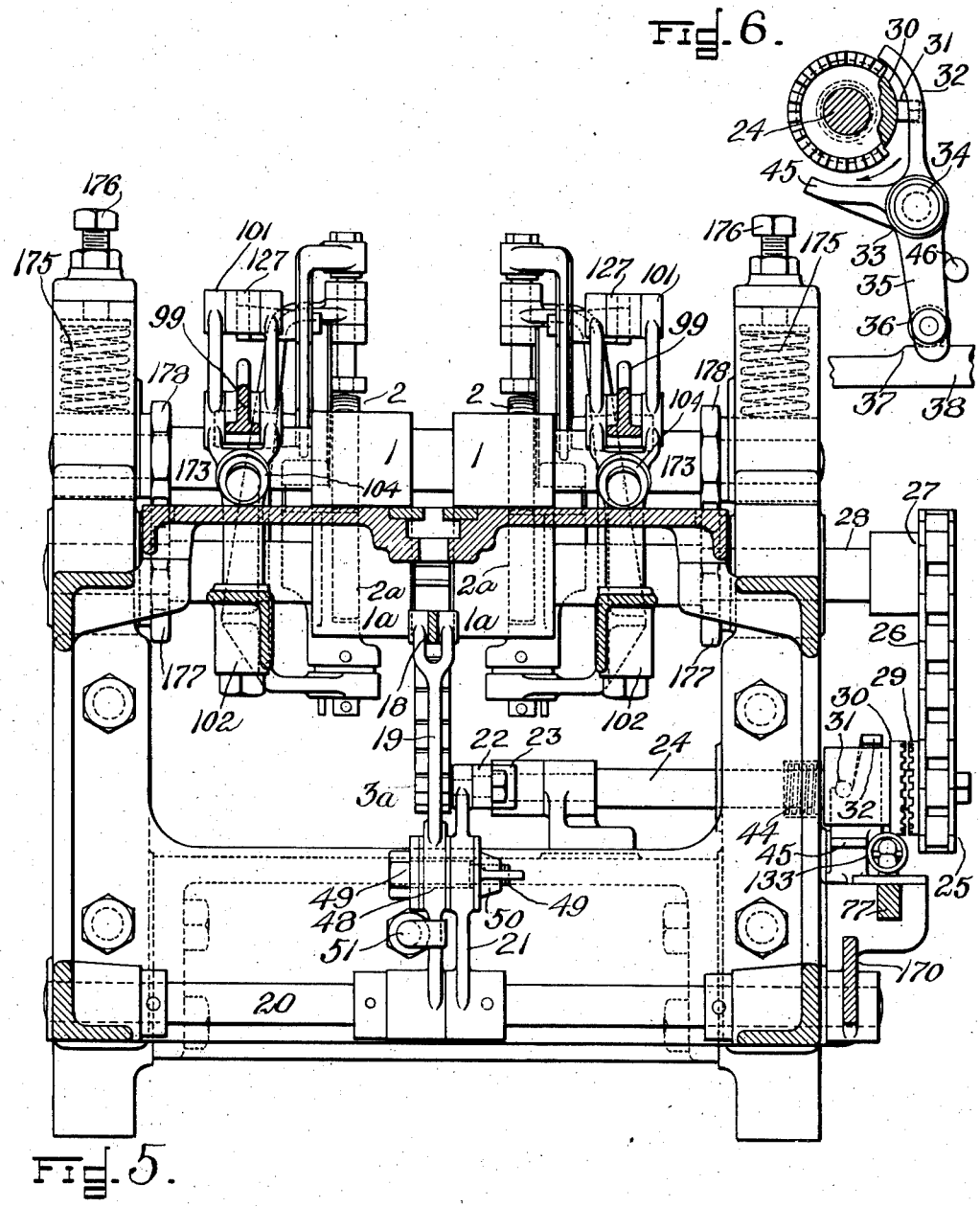
Figures 17, 18:
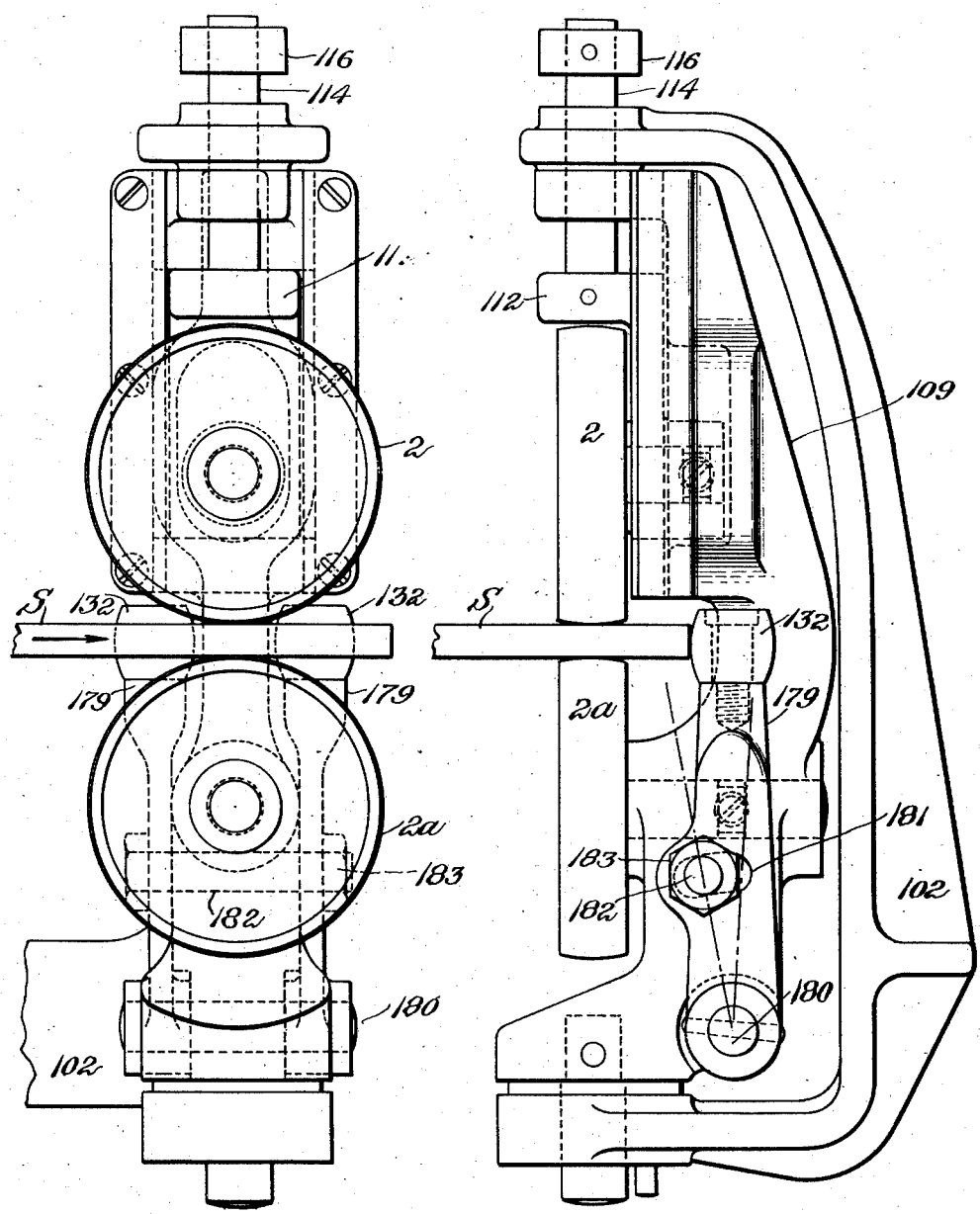

Figs. 3 and 4 together make up a central longitudinal sectional view of the machine shown in Figs. 1 and 2;

Fig. 4ª illustrates an alternative form of presser bar hereinafter described;

Fig. 4ᵇ is a section on line 4ᵇ—4ᵇ of Fig. 4ª;

Fig. 5 is a section on line 5—5 of Fig. 2 after removal of the front wall of the storage magazine from which the blanks are fed;

Fig. 6 is a detail of a clutch shipper hereinafter described;

Fig. 7 is a section on line 7—7 of Fig. 1;

Fig. 8 is an enlarged detail of part of the rack bar which constitutes the power transmission member for adjusting the grading devices, together with the pawls for controlling the rack bar;

Fig. 9 is an elevation of a portion of the left-hand end of the machine shown in Figs. 1 and 2;

Fig. 10 is an enlarged detail relating to the cutting mechanism;

Fig. 11 is an enlarged detail relating to the mechanism for setting and preserving the thinness measurements ascertained by the calipering device;

Fig. 12 is an enlarged plan view of a portion of the left-hand end of the machine shown in Figs. 1 and 2 showing a sole approaching the calipering devices;

Fig. 13 is a section on line 13—13 of Fig. 12;

Fig. 14 is an elevation of one of the calipering casters viewed from the left of Fig. 13;

Fig. 15 is an elevation, partly in section, of said caster viewed from the left of Fig. 14;

Fig. 16 is a section on line 16—16 of Fig. 15;

Figs. 17 and 18 are elevations, corresponding respectively to Figs. 14 and 15, of a modified form of calipering device; and Figs. 19 and 20 are similar elevations of still another form of calipering device.

The machine herein illustrated comprises a magazine or hopper H (Figs. 1, 2 and 3) for holding a stack of blanks to be operated upon. In the present case this hopper is designed to hold a stack of soles or similar blanks and is shown as loaded with a stack of soles S. The soles are fed forward toe end foremost one at a time from the bottom of hopper H to a pair of continuously driven feed rolls 1 and 1ª (Figs. 1, 2, 3, 5 and 13) which positively deliver the soles into the measuring mechanism.

The measuring mechanism comprises two detecting and calipering casters, each including an upper calipering roll 2 and a lower calipering roll 2ª, which traverse the marginal portions only of the blank and follow the contour of the edge of the blank.

As the forward end of each blank emerges from between the calipering rolls 2 and 2ª it enters between a presser bar 3 and a continuously driven conveyor chain 3ª (Figs. 1, 2, 3, 4 and 7). The blank is carried forward between the presser bar 3 and the conveyor chain 3ª to a pair of continuously driven feeding and skiving rolls 4 and 4ª (Figs. 1, 2, 4 and 10), which propel the blank past the cutting edge of a fixed knife blade 5, by which the blank is skived or evened to a uniform thickness which corresponds to the thinnest spot of the marginal portions as detected and measured by either pair of calipering rolls 2 and 2ª. The conveyor 3ª may be provided with traction pads of known construction and is driven by a continuously driven sprocket wheel 149 (Fig. 4).

The mechanism for feeding the soles or other blanks forward one by one from the bottom of the stack in hopper H includes a pawl 6 (Figs. 2 and 3) which is normally at rest in a retracted position as shown in the drawings. The feed pawl 6 is operated to feed a blank into the machine each time the preceding completed blank is removed from the machine. As the forward end of each blank emerges from between the skiving rolls 4 and 4ª it engages and swings forward and upward a roller on the end of a trip arm 7 (Fig. 4), which prepares or sets for operation the mechanism by which the feed pawl 6 is actuated. The arm 7 remains supported by the blank until the blank is manually, or it may be automatically, removed from the machine whereupon the arm 7 is automatically restored to its original position by a spring, as hereinafter described, and acts through other mechanism, presently to be described, to bring about a single reciprocatory movement of the feed pawl 6 toward and from the feed rolls 1 and 1ª. Thus the removal of a completed blank from the machine causes the feed pawl 6 automatically to move forward and to feed the lowermost blank from the hopper H and deliver it to the feed rolls 1 and 1ª, after which the feed pawl returns to its normal, retracted, inoperative position where it remains at rest until the next completed blank is removed from underneath the trip arm 7. In the machine illustrated in the drawings it is contemplated that the completed blank is to be removed from under the trip arm 7 by hand. In some known grading machines of this type a pair of ejecting rolls are provided for seizing the blank after it emerges from between the skiving rolls 4 and 4ᵃ and ejecting it from the machine. Such ejecting rolls (not herein shown) may be used, if desired, in which case the fall of arm 7 and the consequent operation of the feed pawl 6 will be effected automatically instead of manually.

The hopper H (Figs. 1, 2 and 3) comprises a bottom or floor 8 whose top surface is smooth and flat, a fixed front wall 9 of usual construction and a movable rear wall 10 of usual construction adjustable toward and from the fixed front wall according to the size of the blanks and provided with means for fixing it in adjusted position. At the bottom of the fixed front wall 9 there is the usual spring pressed detent 11 (Fig. 3) which prevents more than one blank at a time from being fed forward into the machine.

The floor 8 of the hopper is formed with a longitudinal slot 12 within which slides a carriage 13 upon which the feed pawl 6 is pivoted at 14. The feed pawl 6 is free to swing in one direction on its pivot 14 to a limited extent determined by a stop lug 15 on the carriage 13, and in the opposite direction to a limited extent determined by an adjustable stop screw 16 carried by the carriage. When the pawl 6 is against stop lug 15 the blank engaging nose 17 of the pawl is held below the plane of the top surface of the floor 8, but when the pawl 6 is swung against stop screw 16 its nose 17 is raised above the level of the floor 8 and is in position to engage the lowermost blank in the hopper H.

The lower end of the pawl 6 is connected by a link 18 with an arm 19 which is loosely mounted on a rock shaft 20 (Figs. 2, 3 and 5). Fixed to rock shaft 20 along side the arm 19 is another arm 21 which is frictionally and yieldingly connected with arm 19. The free end of arm 21 is connected by a link 22 with a crank arm 23 fast on shaft 24 which is normally at rest. Loosely mounted on the end of shaft 24 outside of the frame of the machine is a sprocket wheel 25 (Figs. 2 and 5) connected by a chain 26 with a sprocket wheel 27 fast on the continuously rotating shaft 28 of the lower feed roll 4ᵃ, the latter being continuously driven by the conveyor chain 3ᵃ. The continuously rotated sprocket wheel 25 carries a clutch member 29 (Fig. 5). A complementary clutch member 30 is splined on shaft 24 so as to be movable axially of the shaft into and out of engagement with clutch member 29. The clutch members are normally disengaged. The clutch member 30 carries a radially projecting pin 31 normally resting against a stop shoulder on an arm 32 of a clutch shipper 33 (Figs. 2, 5 and 6), which is pivotally mounted at 34 on the frame of the machine. The shipper member 33 has a depending arm 35 carrying a roller 36 at its lower end to cooperate with an inclined shoulder 37 provided upon a push bar 38. The push bar 38 extends forward approximately to the right-hand end of the machine, as viewed in Fig. 2, and is connected by a bell-crank lever 39, pivoted to the machine frame, with the lower end of a link 40 whose upper end is pivoted to an arm 41 fast on the transverse rock shaft 42, to which the trip arm 7 is fastened. A spring 43 (Fig. 2) connected at one end with link 40 and at the other end with the frame of the machine yieldingly urges the trip arm 7 downward toward its lowermost position and yieldingly urges the push bar 38 endwise toward the left.

When a finished blank emerging from between rolls 4 and 4ᵃ engages and swings the trip arm 7 to the right it acts through rock shaft 42, arm 41, link 40 and bell crank 39 to move the push bar 38 toward the right (Figs. 2 and 6) thereby shifting the shoulder 37 to the right of roll 36. At the same time a spring 47 (Fig. 2) causes the push bar 38 to swing upwardly and holds the push bar 38 in contact with roll 36. This brings the shoulder 37 directly behind the shipper roll 36 in a position to engage the roll 36 when the push bar is later shifted toward the left by spring 43. When now the finished blank is removed from under the trip arm 7 the spring 43 forces the push bar 38 toward the left thereby acting through shoulder 37 to swing the shipper member 33 in the direction to disengage the stop arm 32 from the radial pin 31 of clutch member 30. Thereupon a spring 44, indicated by dotted lines in Fig. 5, shifts clutch member 30 axially on shaft 24 into engagement with the rotating clutch member 29, thus rotating the shaft 24 and crank arm 23 in the direction indicated by the arrow in Fig. 3.

The shipper member 33 also has a third arm 45 which is raised into the path of the pin 31 when the stop arm 32 is disengaged from said pin, with the result that as said pin 31 in its rotation passes the arm 45 it restores the shipper member 33 to its normal position against a stop 46 on the frame of the machine (Fig. 6), so that when the clutch member 30 is completing one revolution the pin 31 reengages the inclined side of the stop arm 32 (Figs. 1 and 5) which acts as a cam to shift clutch member 30 axially on the shaft 24 in the direction to disengage the clutch member 30 from the clutch member 29. As the shipper member 33 is swung back to its normal position by the action of pin 31 on arm 45 the roller 36 is positively forced past the shoulder 37 on push bar 38 into the position shown in Figs. 2 and 6, the spring 47 permitting the bar 38 to yield downwardly during this return movement of the shipper member.

As shown in Figs. 3 and 5 the arm 19 (on shaft 20) through which the feed pawl 6 is reciprocated is made with an arcuate slot 48 concentric with the axis of the shaft 20. This slot is engaged by a bolt 49 carried by the arm 21. The bolt 49 is provided with a head at one end and a wing nut 50 at its opposite end, which may be set up sufficiently tight to provide a frictional power transmitting connection between the two arms, positive enough to actuate the feed pawl 6 under normal conditions but nevertheless capable of yielding or slipping to permit the arm 21 to move independently of the arm 19 in the event that a blank should become clogged in the hopper. Upon the return movement of the arm 21 toward the left this frictional connection will cause the arm 19 to move with it until the arm 19 engages a stop 51 projecting from the frame of the machine, after which the yielding frictional connection will permit the arm 21 to complete its movement toward the left independently of the arm 19 until the arm 21 reaches the limit of its stroke. In this manner the two arms 19 and 21 are automatically restored to their normal relationship and the feed slide 13 to its normally retracted position at the conclusion of the feeding and return stroke of the arm 21 during which the proper action of the feed slide 13 and feed pawl 6 has been prevented through clogging or has been otherwise obstructed.

The presser bar 3 is disposed longitudinally of the machine directly above and parallel to the path of the soles and the conveyor 3ª, and is carried by a pair of parallel arms 52 and 53 (Fig. 4) of equal length, whose lower ends are pivotally connected with said bar. The arm 53 is pivotally mounted at 54 upon a cross bar of the machine frame and the arm 52 is fast upon a transverse rock shaft 55 journaled in bearings on another cross bar of the machine frame. The presser bar 3 thus swings in parallelism with the conveyor 3ª. At one end of shaft 55 outside of the machine frame is fixed an arm 56 (Figs. 1, 2 and 4) to which is connected one end of a spring 57. The spring 57 acts through arm 56, rock shaft 55 and arm 52 yieldingly to urge the presser bar 3 downwardly and to the left. Movement of the presser bar in that direction is limited by the engagement of a lug 58 on arm 52 with a crossbar of the machine frame (Fig. 4). The presser bar 3 may be equipped with a plurality of anti-friction trucks or rollers 59 which travel on the top side of the blanks as they are fed through the machine by the conveyor chain 3ª. Thus, as the soles pass through the machine they are held by the spring-pressed bar 3 firmly in engagement with the traveling conveyor 3ª by which they are carried forward to the skiving rolls 4 and 4ª.

As the forward end of the blank approaches the skiving rolls 4 and 4ª it engages and depresses a trip 60 (Fig. 4) which acts through usual mechanism to effect a single vertical reciprocation of a slide 61. The slide 61 carries a marking or stamping wheel 62 of known construction whose periphery is made with marking characters or types indicating grades, usually in terms of irons and half irons.

The type wheel 62 is rotatably adjusted as usual by the endwise movement of a transverse slide bar 63 (Figs. 1, 2 and 4), mounted in ways on the frame of the machine, and when the type wheel is forced down on top of the blank by the reciprocation of slide 61 the appropriate grade mark is impressed upon the blank.

During the operation of the machine the slide bar 63 is adjusted endwise and set in response to and in accordance with the thickness of the thinnest part of the blank as determined by the detecting and measuring mechanism.

The upper skiving roll 4 (Fig. 4) is journaled in journal boxes 64 which are mounted to move in vertical ways 67 on the frame of the machine. Each journal box 64 is provided upon its top side with the usual wedge block or inclined abutment 65 (Figs. 4 and 10) to cooperate with a similar inverted wedge block or inclined abutment 66 on the under side of slide bar 63. The opposed faces of the wedge blocks may be stepped, as usual, to provide horizontal stop surfaces.

The lower feed roll 4ª is journaled in journal boxes 68 which are also mounted to slide in the vertical ways 67 and are yieldingly supported as usual by a pair of stiff springs, one of which is shown at 69.

When the forward end of a blank enters between the skiving rolls 4 and 4ª, the slide bar 63 having previously been adjusted by the detecting and measuring mechanism in accordance with the thickness grade of that blank, the upper roll 4 is lifted until its pair of wedge blocks or abutments 65 engage and are stopped by the pair of abutments 66 on slide bar 63. The distance between roll 4 and the edge of the knife blade 5 now corresponds to the thickness of the thin spot of the blank as determined by the measuring mechanism and determines the thickness to which the blank will be evened or skived. Thicker areas of the blank will force the lower roll 4ª downward against the pressure of springs 69 and will be skived off by the knife.

The cutting mechanism itself, including the rolls 4 and 4ª and the knife blade 5, also the marking mechanism including the type wheel 62, slide 61 and connections between the type wheel 62 and the adjustable slide bar 63, also the trip 60 and the mechanism through which it effects the operation of the stamping slide 61, may all be of usual and known construction.

The transverse slide bar 63 is made with a rack of teeth 70 (Fig. 1) meshing with a pinion 71 fixed to the upper end of a vertical shaft 72 journaled in bearings on the machine frame. At the lower end of shaft 72 is fixed a pinion 73 meshing with a rack bar 74 (Fig. 2). The rack bar 74 is attached at one end to a slide 75 mounted in ways 76 on the machine frame and the slide 75 is in turn attached to one end of another rack bar 77 which is mounted to slide on ways in bracket 78 on the machine frame. The opposite end of rack bar 77 is provided with a rack of teeth 79 meshing with a gear 80 fast on a transverse shaft 81 (Figs. 2 and 9) journaled in bearings on the frame of the machine.

Fixed to shaft 81 are a pair of abutment arms 82 (Figs. 3, 9 and 13) which coact with a pair of stop arms 83 loosely mounted on shaft 81. Each stop arm 83 is made with a hub provided with a gear segment 84 (see also Fig. 11) which meshes with a rack of teeth 85 on a vertical slide bar 86. Each slide bar 86 has an arm or lug 87 formed with an aperture 88 through which loosely extends a vertical stem 89. Each stem 89 is provided at its lower end with a pair of adjustable abutment nuts 90 to cooperate with the under side of lug 87.

The upper part of each vertical slide bar 86 is also provided on its inner face with a rack of ratchet teeth 91 which cooperate with a pair of pawls or detents 92 (Figs. 3, 11 and 13). Said detents are pivotally mounted at 93 on the frame of the machine and are normally held in retracted or inoperative position against the pull of spring 96 by a pin 94ª on arm 94 fast on a rock shaft 95. There are two arms 94 on rock shaft 95, one for each pair of detents 92 and said rock shaft also has fixed to its end an arm 97 (Figs. 1, 3 and 9) which is connected by a link 98 to the arm 56 on rock shaft 55 which carries one end of the presser bar 3, as already described. Hence the swinging movements of presser bar 3 engage and disengage the pawls 92 with their racks 91.

The upper end of each stem 89 is pivotally connected to a lever 99 through which the findings of the calipering rolls are transmitted to the setting mechanism and thence to the grading mechanism. Each lever 99 (Figs. 1, 3, 9, 12 and 13) is fulcrumed at 100 on an upright post 101 which is a rigid part of an arm 102. The arm 102 is pivotally supported at 103 underneath the floor of the hopper (Fig. 13) so as to swing laterally and horizontally in a path parallel to the floor 8 of the hopper. There are two arms 102, one for each pair of calipering rolls and their associated parts and one disposed at each side of the hopper H. The free end of each arm 102 is supported in part by a truck or roller 104 journaled on post 101 and rolling upon the flat top surface of the floor 8 as the arms swing laterally. The pivot of each arm 102 is a tubular stud screw 105 (Fig. 13) threaded into the bottom plate of the hopper, and the stem 89 connecting lever 99 to slide bar 86 extends through the tubular screw 105. Consequently when arms 102 are swung laterally their levers 99 are free to move with them.

On the free end of each arm 102 is an upright yoke 106 (Figs. 13 and 14) having an inwardly extending lower arm 107 and an inwardly extending upper arm 108. Both of these arms are provided with apertures in which is swiveled the calipering caster. The caster comprises a frame 109 on which are mounted the two calipering rolls 2 and 2ᵃ. The lower calipering roll 2ᵃ is provided with a trunnion 110 confined within a bearing provided in the lower part of the caster frame 109. The upper part of the caster frame is formed with vertical ways 111 within which is mounted a slide 112 having a stud 113 on which the upper calipering roll 2 is journaled. From the upper end of slide 112 a vertical stem 114 extends upwardly through an apertured lug 115 provided at the top of the caster frame 109, and also upwardly through the aperture in the upper arm 108 of the yoke 106. Above the arm 108 is a collar 116 fast on stem 114 which, by engagement with the top of the arm 108, serves as a stop to limit the downward movement of slide 112 and its upper roll 2. When the stop collar 116 is against the arm 108 the upper calipering roll 2 is just out of contact with the lower roll 2ᵃ. The lower end of the caster frame 109 is provided with a vertical trunnion 117 axially aligned with the stem 114 and extending downwardly through the aperture in arm 107. Thus, the caster frame is free to oscillate on the vertical axis of stem 114 and trunnion 117. A thrust ball bearing 118 is interposed between the lower arm 107 of the yoke and the lower end of the caster frame 109.

Trunnion 117 is provided near its lower end with a short laterally extending arm or pin 119 which is normally held in engagement with a stop pin 120 on yoke 106 by means of a spring 121, which connects the caster frame 109 and the yoke 106. Spring 121 is not always essential but when employed it serves to hold the caster frame in the oblique position relative to the path of the blanks as illustrated in Fig. 12. This oblique position facilitates the entry of a sole S between the two casters, especially when the sole has a broad forward end and under certain conditions of adjustment of the stops 121 which limit the movement of the arms 102 toward each other under the influence of springs 122. The springs 122 serve to hold the two casters yieldingly against the opposite side edges of the blank as the latter passes between them.

The upper end of the stem 114 is positioned immediately beneath and against an arm 123 which forms a part of a link 124, whose lower end is pivotally connected at 125 with the short arm of lever 99. A link 127 is pivoted at one end at 128 to the top of post 101 and its other end is pivoted at 126 to link 124. The distance between pivot 128 and fulcrum 100 is the same as the distance between pivots 126 and 125. Also the distance between pivots 126 and 128 is the same as the distance between pivot 125 and fulcrum 100. This construction provides a parallel motion.

A spring 129 connecting the short arm of lever 99 to the swing arm 102 serves yieldingly to urge the stem 89 and slide bar 86 upwardly, and also serves yieldingly to press the upper calipering roll 2 downwardly toward the lower roll 2ᵃ so as to yieldingly pinch the blank between the two rolls. As the calipering rolls traverse an uneven blank passing between them the upper roll 2 is moved toward and from the lower roll 2ᵃ and this motion is transmitted through link 124, lever 99 and stem 89 to the sliding ratchet bar 86. The difference in length between the two arms of lever 99 as opposite sides of the fulcrum 100 is preferably such as to multiply the vertical movement of the calipering roll 2 three times. Thus, if the calipering roll 2 is displaced upwardly by the blank ten irons the stem 89 and slide bar 86 will be lowered thirty irons, assuming the detents 92 to be disengaged from the ratchet bar 86. When the detents 92 are engaged with the slide bar 86 the latter can not be displaced downwardly but only upwardly. The downward movement of slide 86 is effected by gravity assisted by a light coil spring 130 (Figs. 3 and 13) surrounding the stem 89. This spring abuts at one end against the lug 87 and at its other end against a pair of abutment nuts 131 adjustably mounted on the stem 89. The nuts 131 also serve to limit the upward swing of the long arm of lever 99 by engagement with the head of the tubular screw 105.

Each caster frame 109 also has mounted on it a pair of trucks or rolls 132 which rotate in a horizontal plane on vertical axes at one side of the calipering rolls 2, 2ᵃ. These two rolls 132 constitute guiding rolls for engagement with the edges of the blank to guide the caster and cause the calipering rolls 2, 2ᵃ to traverse the margin of the blank and follow the contour of the edge. The guiding rolls 132 are preferably so positioned that their peripheries are substantially tangent to the plane of the inner faces of the calipering rolls and are also preferably spaced apart one on each side of and equally distant from the plane passing through the axes of the two calipering rolls.

In practice satisfactory results have been obtained by making the calipering rolls 2 and 2ᵃ about one-half an inch thick, although this may be varied in accordance with the width of the marginal area which it is desired to gauge. While the sole or other blank is passing between the calipering casters the guiding rolls 132 maintain the calipering rolls in contact with the marginal portions only of the sole and the springs 122 (Fig. 12) compel the guiding rolls to fit themselves to the curvature of the edges of the sole and to follow the contour of the edges as indicated by dotted lines at a and b, which show different positions of the caster. The arrows c (Fig. 12) indicate the marginal paths on the sole traversed by the calipering rolls and the arrow d indicates the direction of movement of the sole through the machine.

The rack bar 77 has connected to it one end of a comparatively heavy and dominant spring 133 (Figs. 1 and 2) the opposite end of which is connected at 134 with the frame of the machine. The spring 133 is normally under tension and tends to shift the rack bar 77 toward the right as indicated by the arrow in Fig. 2. The rack bar 77, however, is normally prevented from shifting to the right by one or the other of a pair of detents 135 which engage a rack of ratchet teeth 136 fixed to the bar 77 (Figs. 2 and 8). The rack bar 77 constitutes the power transmission member by which the grading devices are adjusted. The pawls 135 are controlled by a trip in the path of the blanks passing through the machine. This trip and the mechanism for controlling the pawls 135 include a trip arm 137 (Figs. 1, 2 and 7) provided at its free end with a roller 138 which normally lies in the path of the blanks and is engaged and lifted by each blank passing underneath it. The other end of the trip arm 137 is made with a split hub which is clamped on a rock shaft 139 with provision for adjustment lengthwise of the rock shaft by means of a thumbscrew 140. The shaft 139 is square in cross section for the greater part of its length but is made with cylindrical end portions journaled in bearings on the frame of the machine.

One end of the shaft 139 carries an arm 141 to which is pivotally connected a depending push rod 142. The lower end of the push rod 142 engages the tail pieces of pawls 135. A spring 143 surrounding the lower part of push rod 142 bears at one end against a bracket 144 on the machine frame and at the other end against a washer 145 held in position on the push rod by a pin 146. The spring 143 yieldingly holds the push rod to the limit of its upward movement with the trip arm 137 and trip roll 138 in depressed position in the path of the blanks. When the forward end of a blank comes underneath trip roll 138 it acts through arm 137, rock shaft 139, arm 141 and push rod 142 to disengage both detents or pawls 135 from the ratchet teeth 136, whereupon the spring 133 shifts the rack bar 77 toward the right (Fig. 2). This movement of rack bar 77 also shifts the slide 75 and rack bar 74 to the right and the movement of rack bar 74 rotates pinion 73, shaft 72 and pinion 71 in a direction to shift the transverse slide bar 63 endwise to the left as indicated by the arrow in Fig. 10, that is, away from the observer in Fig. 2. This movement, under the influence of the heavy spring 133, is retarded or cushioned to avoid undue shocks by a dashpot 147 whose piston rod 148 is connected with an arm projecting from the slide 75.

When the rack bar 77 is thus released from the locking pawls 135 and shifted to the right (Fig. 2) it also acts through rack 79 and gear 80 to rotate the shaft 81 in the direction of the arrows (Figs. 2 and 3) until one or the other of the abutment arms 82 fixed to shaft 81 is brought into engagement with its complementary stop arm 83, which has previously been adjusted and set by one of the marginal calipering devices. This engagement of one of the arms 82 with one of the arms 83 limits the extent of movement of the rack bar 77 under the influence of spring 133, the stop arms 83 being rigidly locked against angular displacement in that direction by the engagement of the detents 92 with the ratchet teeth 91 of the slide bars 86.

During the measuring of the blank by the calipering rolls the two stems 89 will be moved up and down in response to differences in thickness of different parts of the blank but owing to the fact that the detents or pawls 92 are in engagement with the ratchet teeth 91 during the measuring operation, the slide bars 86 can be adjusted upwardly only, in response to successively thinner spots encountered by the calipering rolls, since the ratchet teeth 91 face downwardly.

When a thicker part of the blank is encountered by the calipering rolls causing the rolls 2 to move upwardly the stems 89 are free to move downwardly by reason of the yielding connection 130 between the stems 89 and slides 86, without affecting the slides 86 which are locked by pawls 92 against downward movement.

The effective strength of the dominant spring 133 is greater than that of both springs 129 (Fig. 13) so that even after the rear end of the blank has passed from between the calipering rolls the longer arm of the lever 99, which is connected with the then effective stop arm 83, will be held depressed by the spring 133. Therefore, as soon as the rear end of the blank departs from between the calipering rolls the upper rolls 2, together with their slides 112 and stems 114, will independently fall by gravity to their lowermost position.

Trip 138 on trip arm 137 (Fig. 7) is so positioned as to be engaged by the forward end of the blank before the rear end of the blank leaves the calipering rolls. Hence the spring 133 will be in control of the slide bars 86 before the upper calipering rolls are released by the blank. Also by the adjustment of trip arm 137 lengthwise on rock shaft 139 the length of the part of the blank which is to be calipered may be varied.

It will now be clear that the calipering rolls, which traverse the opposite side margins of the blank and by which the thinnest spot is detected, will control and determine the extent of movement toward the right (Fig. 2) of rack bar 77, and that the extent of movement of the rack bar 77 and of slide bar 63 occasioned by the operation of trip 137 will be directly proportional to the thickness of the thinnest spot of the marginal area as determined by either of the two calipering devices. Said movement of the rack bar 77 and slide 63 will be six times the corresponding movement of the calipering roll 2 in response to variations in the actual thickness dimensions of the blank, since the pitch diameter of gear 80 is twice as great as the pitch diameter of gear segments 84. Therefore the linear movement of rack bar 77, under the influence of spring 133, will always be twice that of the downward displacement of the slide bar 86 which is effective at the time, that is, the slide bar 86 which occupies the higher position at the moment trip 137 is operated. The slide bar 86 occupying the higher position will be the one associated with the calipering rolls which detected the thinnest spot in the blank before the operation of trip 137.

Since the movement of the slide bar 86 is three times that of the upper calipering roll which controls it, the teeth 91 are spaced one-sixteenth (1/16) of an inch apart to correspond to a displacement of the upper calipering roll 2 of one iron (1/48 of an inch); and in order to provide for the measurement of a half iron the pawls 92 differ in length one thirty-second (1/32) of an inch so that one or the other of the two pawls 92 will engage the ratchet teeth 91 within a tolerance corresponding to a half iron. Similarly, since the movement of the rack bar 77 is twice as great as that of the rack slide 86, the teeth of ratchet 136 are spaced one-eighth (1/8) of an inch apart and the two pawls 135 differ in length one-sixteenth (1/16) of an inch.

The sprocket wheel 149 (Fig. 4) by which the conveyor chain 3ª is driven is fast on a transverse shaft 150, on which is also fixed a second sprocket wheel 151 (Fig. 2) connected by a chain 152 with a sprocket wheel 153 fast on shaft 154 of the lower feeding and skiving roll 4ª. Shaft 154 also has fixed to it a gear wheel 155 (Figs. 1 and 2) which is driven by another gear 156 fast on the continuously driven shaft 157.

Shaft 157 is the main driving shaft of the machine and is provided with a tight pulley 158 and a loose pulley 159 (Fig. 1) for the usual power driven belt (not shown).

The main shaft 157 has also fixed to it a gear meshing with a gear 160 (Figs. 1 and 4) for continuously driving a gear 161 fast on the shaft 162 of the upper feeding and skiving roll 4.

The upper horizontal stretch of the conveyor chain 3ª occupies a groove or channel 163 (Figs. 4 and 7) on top of the bed plate 164, by which the chain is supported and guided. The end of this plate toward the measuring devices is made with a narrow grooved horn or extension 165 (Figs. 1 and 3) which occupies a central position between the two calipering casters. The free end of this extension 165 projects close to the feed rolls 1 and 1ª so that the horizontal stretch of chain 3ª is supported throughout approximately its entire length.

Referring to Fig. 12 the stop 121 for each swing arm 102 is the head of a bolt whose shank extends loosely through a hole 166 in arm 102 and thence loosely through an aperture 167 in the side frame of the machine to the outer side of the frame where it is provided with adjustable abutment nut 168, which cooperates with the frame to limit the inward swing of the arm 102 under the influence of spring 122. The abutment nut 168 is fixed in its adjusted position by means of a wing nut 169. The coiled spring 122 on each stop bolt 121 is confined between its arm 102 and the side of the frame. The stop bolts 121 may be adjusted and set to accord with the width of the blanks being operated upon.

After a blank has been marked, evened or otherwise graded, it is necessary to restore the rack bar 77 to its original position ready for another blank, with the spring 133 under tension. This is accomplished by mechanism actuated by the feeding mechanism. As already explained the removal of a finished blank from the machine, thereby allowing trip arm 7 to fall, results in rocking the shaft 20 first to the right and then to the left to impart a single reciprocation to feed pawl 6. Fixed to one end of rock-shaft 20 outside of the frame of the machine is an arm 170 (Fig. 2) to which is attached one end of a chain 171 whose opposite end is attached to a pulley 172 fast on shaft 81 (Figs. 1 and 9). When shaft 20 is rocked to the right it acts through arm 170, chain 171 and pulley 172 to turn shaft 81 to the left, thereby turning gear 80 to the left and acting through rack 79 to shift rack bar 77 to its initial position at the left with the spring 133 under tension. During this return movement of rack bar 77 the pawls 135 click or trail idly over the teeth of ratchet 136 but engage and hold the ratchet and the bar 77 against movement toward the right. When the arm 170 swings back to the left at the conclusion of its single reciprocation the chain 171 is slack, as shown in Fig. 2, thus leaving the shaft 81 free to be angularly adjusted by rack bars 86 during the detecting and measuring operation.

When the rear or trailing end of the blank passes out from beneath the presser bar 3 the spring 57 (Fig. 1) acts through the connections already described to restore the presser bar to its normal depressed position and to disengage both set of pawls 92 (Figs. 3, 11 and 13) from ratchets 91. Thereupon the springs 129 (Fig. 13) restore levers 99, slides 86 and stop arms 83 to their normal position as soon as the abutment arms 82 are returned to their normal position by the movement of rack bar 77 to the left by arm 170. At the time when the rear end of the blank moves out from under the presser bar 3 and the latter falls, as just described, the blank is between the feeding and skiving rolls 4 and 4ª. Under these conditions the transverse slide bar 83 is clamped immovable by the pressure of the lower wedge blocks 65 against the upper wedge blocks 66. Consequently, when the pawls 92 are retracted, the wedge-carrying slide bar 63 remains locked against displacement until the blank is discharged from between rolls 4 and 4ª. At this time also the pawls 135 are in holding engagement with the rack 136 so that when the blank is discharged from between rolls 4 and 4ª and the pressure between the upper and lower wedges 66, 65 is relieved the rack bar 77 will still be locked by pawls 135 against further movement toward the right.

The upper feed roll 1 (Fig. 2) has its shaft 173 journaled in boxes 174 mounted to slide in vertical ways provided on the frame of the machine, said boxes being yieldingly urged downward by springs 175. The upper ends of the springs 175 bear against abutment screws 176 which are adjustable to regulate the pressure of the springs. The continuously driven shaft 28 of the lower feed roll 1ª is journaled in fixed bearings on the frame of the machine and carries gears 177 (Fig. 5) near its ends which mesh with driving gears 178 on shaft 173 of the upper roll.

The operation of the machine is as follows:

Assume that the grading of a blank has just been completed and that the blank has been discharged from the skiving rolls 4 and 4ª and still rests underneath and supports the trip 7 at the outgoing end of the machine. Under these conditions the feed pawl 6 will be in its extreme retracted position; the presser bar 3 will be in its depressed or lowermost position acting through link 98 to hold the pawls 92 disengaged from the ratchets 91 on slide bars 86; the trip 138 will also be in its lowermost or depressed position in the path of the blanks, thereby holding the push rod 142 elevated and the locking pawls 135 in engagement with ratchet 136 on slide bar 77; and the slide bar 77 will stand in a position shifted to the right to the extent determined by the measurement of the outgoing blank.

When the outgoing blank is removed from underneath trip 7 the single-rotation-and-stop clutch on shaft 24 is operated to impart to the feed slide a single reciprocation. At the same time the rack bar 77 is shifted by the movement of the feed-operating mechanism to its extreme position at the left, with the spring 133 under tension, and is there held by locking pawls 135. Both pairs of calipering rolls 2 and 2ª will be held by their springs 129 in their positions of closest approach, with the two ratchet slides 86 in their extreme elevated position. The lowermost blank in the hopper H is fed forward by the feed pawl 6 from the bottom of the stack S into the nip of the feed rolls 1 and 1ª, which seize the blank and advance it to the conveyor chain 3ª and between the two pairs of calipering rolls 2 and 2ª, carried by the two casters swiveled on swing arms 102, which are spread apart by the advancing blank.

At substantially the same time when the advance end of the blank enters between the calipering rolls (see Figs. 2, 3 and 4) it engages the forward end of the presser bar 3 and swings the bar 3 bodily to the right and slightly upward far enough for the blank to pass underneath it. This movement of the presser bar 3 acts through link 98 to let the locking pawls 92 into engagement with the ratchets 91 on slides 86. This starts the effective measuring of the blank substantially simultaneously with the entry of the leading end of the blank between the detecting and calipering rolls, and therefore calipers the blank from its extreme forward end. So long as the pawls 92 are in engagement with their slides 86 the measurement of successively thinner spots in the blank encountered by the calipering rolls 2 and 2ª will be transmitted to and preserved by the slides 86, since the slides 86 are free to be raised by any downward movement of the calipering rolls 2 and are locked by the pawls 92 in the highest position to which they are raised; but any upward movement of calipering rolls 2 in response to thicker regions of the blank will not be transmitted to the slides 86, which are locked by pawls 92 against downward movement. The downward movement of levers 99 and stems 89, in response to thicker measurements of the blank, will be permitted by the yielding connection 130 without affecting slides 86. Consequently the slides 86 will register and preserve the measurement of the thinnest spot determined by the two pairs of calipering rolls 2 and 2ª and these measurements will be confined to the side marginal portions of predetermined widths which are uniform throughout their lengths since the calipering rolls 2, 2ª, are carried by swiveled casters which are guided by rollers 132 to follow the shape and sinuosities of the side edges of the blank.

As the blank advances through the machine, propelled by the conveyor chain 3ª, against which it is firmly held by the yielding spring-pressed presser bar 3, it next encounters and lifts the trip roll 138 on trip arm 137. As the trip roll 138 rides up on top of the blank, it depresses the push rod 142, thereby disengaging pawls 135 from ratchet 136 and permitting the power-transmitting rack bar 77 to shift to the right under the influence of spring 133 until it is arrested by the engagement of one of the stops 82 with one of the stops 83, depending on which one of the stops 83 is set according to the thinner measurement as found by the two sets of calipering devices. This action of the rack bar 77 terminates the measuring operation and adjusts and sets the grading devices (evening and stamping mechanisms) through slide bar 63 in accordance with the then measurement of the thickness of the thinnest part of the blank as determined by either of the two calipering devices. If any variations in thickness of the blank are subseqeuntly encountered by the calipering rolls 2, 2ª, in that part of the blank which has not yet passed between the calipering rolls, such variations will not affect the measurement setting and transmission mechanisms, since the ratchet bars 86 can not be further lifted by the springs 129 because the stops 82 are held under the control of the more dominant and powerful spring 133, nor can the ratchet bars 86 be further lowered in response to thicker areas encountered in the blank since they are still locked by pawls 92.

Upon the further advance of the blank through the machine it next encounters trip 69 and depresses the same, thereby actuating the stamping device by which the type wheel is forced down on top of the blank and impresses thereon the appropriate grade mark, the type wheel having been previously adjusted into position by the slide bar 63 upon the operation of the trip 138.

The blank next enters between the feeding and skiving rolls 4 and 4ª, whose abutment wedge blocks 66 were also adjusted by the slide bar 63 according to the ascertained grade measurement when the trip 138 was actuated, and the blank is skived or evened down by the knife blade 5 to a uniform thickness corresponding to the ascertained measurement of its thinnest spot.

When the rear or trailing end of the blank passes out from under trip 138 the latter falls again to the bed plate and permits the locking pawls 135 again to engage ratchet 136; and when the blank passes out from underneath the presser bar 3 the latter also swings downwardly and to the left to its lowermost or depressed position, thereby disengaging pawls 92 from ratchet slides 86. This, however, will not disturb the adjustment of the grading devices since, as already explained, the slide bar 63 will be held against displacement by the clamping of the wedge blocks 65 and 66 so long as a blank is between the rolls 4 and 4ª, and also by the locking pawls 135.

After the blank has been discharged from between the skiving rolls 4 and 4ª it is withdrawn from underneath trip 7, either manually or automatically, and the cycle of operations just described is repeated with respect to the next succeeding blank.

In the foregoing description of the construction and operation of the machine, the alternative form of presser bar illustrated in Figs. 4ª and 4ᵇ, and the alternative forms of calipering devices illustrated in Figs. 17, 18, 19, and 20, have been disregarded for the sake of clearness. These will now be described.

As already explained, the swinging of the presser bar to the right by the advance end of the blank causes the pawls 92 to engage their ratchets 91 and start the effective measuring of the blank. This occurs, with the construction shown in Figs. 3 and 4, at the same time when the advance end of the blank enters the measuring rolls and so measures the blank from its extreme forward end. It is often desired, however, to allow a certain length of the blank to pass through the calipering devices without being measured, and also to be able to vary the extent of such unmeasured length. For example, soles are often passed through a grading machine heel end first, and since the grade of a sole is determined by the grade of its forepart, the measurements of the heel part are disregarded. In Figs. 4ª and 4ᵇ I have illustrated a presser bar which is adjustable in length to provide for delaying or advancing the time when the effective measuring of the blank will begin, with relation to its passage through the calipering devices. This presser bar is made in two telescoping or sliding sections 3ᵇ and 3ᶜ. The section 3ᶜ consists of two parallel side bars and is pivotally connected at its right hand end with arm 53 (the same as the presser bar 3, Fig. 4). Its left-hand end is pivotally connected with arm 52 and terminates at said arm 52. The section 3ᵇ is of channel shape in cross-section, as best shown in Fig. 4ᵇ, and embraces the left-hand end of section 3ᶜ. The opposed side flanges of section 3ᵇ are formed with longitudinal slots through which extends the pintle 52ª by which the arm 52 is pivotally connected with section 3ᶜ. The pintle 59ª, on which one of the antifriction rollers 59 of section 3ᶜ is journaled, is made in the form of a bolt having a head at one end and a threaded shank at the other end provided with a nut 59b, and also having an annular shoulder 59c to bear against the inner face of one of the side bars forming section 3c (Fig. 4b). The bolt 59a extends through another pair of longitudinal slots in the side flanges of section 3b. When the nut 59b is loosened, the section 3b can be adjusted lengthwise of section 3c, thereby varying the position of the forward end of the presser bar with relation to the calipering rolls 2, 2a, and so governing the timing of the beginning of the effective measuring of the blank.

Referring now to the modified forms of calipering devices, Fig. 17 is an end elevation of one of the swing arms 102 showing the same equipped with a calipering caster somewhat different from that illustrated in Figs. 14, 15, and 16, and Fig. 18 is a side view of the parts shown in Fig. 17. Each guide roll 132 is rotatably mounted on the upper end of an arm 179, the two arms 179 being fixed at their lower ends to a spindle 180 journaled in a bearing on the caster frame 109. Each arm 179 is formed with an arcuate slot 181, through which passes a bolt 182 provided with a nut 183. By loosening the nut 183, the two arms 179, together with their guide rolls 132, may be adjusted as a unit toward or from the calipering rolls 2 and 2a. The bolt 182 extends loosely through a hole in the caster frame 109, and when the desired adjustment of the guide rolls 132 has been obtained, the nut 183 is set up tight. By thus adjusting the edge guiding means with relation to the marginal measuring rolls, the marginal path traversed by the measuring rolls may be shifted closer to or farther from the edge of the blank within the limits permitted by the adjustment.

A still further modification of the calipering device is shown in Figs. 19 and 20, Fig. 19 being an end elevation, partly in section, and Fig. 20 a side view of parts illustrated in Fig. 19. The free end 102a of the swing arm is formed with vertical ways 184, within which is mounted a slide 112a. At its lower end the slide 112a is constructed with a ball bearing socket 185, in which is confined a measuring roller in the form of a steel ball 186 adapted to ride on the top side of the blank S being measured. Directly below the ball 186 is another steel ball 187 rotatably confined in a ball bearing socket 188 provided on the end 102a of the swing arm. The ball 187 engages the bottom side of the blank and serves as the lower measuring roller. In this form of mechanism a single guide roller 189 is provided to engage the edge of the blank. The guide roller 189 is rotatably mounted on the upper end of a bail-shaped member 190, whose two legs are pivoted at 191 to the part 102a. The legs of member 190 are formed with arcuate slots 192, through which extends a transverse bolt 193, provided with a nut 194, by which the member 190 and its guide roller 189 may be adjusted toward or from the balls 186 and 187, to cause the balls to traverse a marginal path closer to or farther from the edge of the blank as desired. Since the balls are free to rotate in any direction, there will be no side slip of the measuring rollers as they follow curves along the margin of the blank. Moreover, as there is a single guide roller directly opposite the nip of the measuring rollers, the marginal path defined by the measuring rollers will conform somewhat more accurately to the edge contour of the blank than when two guide rollers are used.

I claim:

1. In a grading machine, a measuring mechanism comprising two calipering devices between which are passed the blanks to be measured, each of said calipering devices being individually operable to traverse and caliper only the adjacent marginal portion of each blank, each calipering device being individually movable laterally and swively mounted to follow the edge contour of the blank independently of the other calipering device, and means through which said calipering devices control the action of other mechanism of the machine according to the thickness of the thinnest part of the blank as determined by either calipering device.

2. In a grading machine, a measuring mechanism comprising two calipering devices between which are passed the blanks to be measured, each of said calipering devices being individually operable to traverse and caliper only the adjacent marginal portion of each blank, each calipering device being individually movable laterally and swively mounted to follow the edge contour of the blank independently of the other calipering device, adjustable grading means and setting mechanism responsive to the measuring mechanism adapted to govern the adjustment of the grading means in accordance with the thickness of the thinnest part of the blank as determined by either calipering device.

3. In a grading machine, a measuring mechanism comprising two calipering devices between which are passed the blanks to be measured, each of said calipering devices being individually operable to traverse and caliper only the adjacent marginal portion of each blank, each calipering device being individually movable laterally and swively mounted to follow the edge contour of the blank independently of the other calipering device, and means to cause the two calipering devices each independently of the other to follow the contours of the two opposite side edges of the blanks passing between them.

4. In a grading machine, a measuring mechanism comprising two independent swiveled calipering casters between which are passed the blanks to be measured, two supports movable toward and from each other on which the two casters are respectively mounted, each caster having a pair of calipering members for engaging between them the margin of the blank being measured, and a guide for engaging the side edge of the blank and controlling the path of the calipering members along the margin of the blank.

5. In a grading machine, a measuring mechanism comprising two independent swiveled calipering casters between which are passed the blanks to be measured, two supports movable toward and from each other on which the two casters are respectively mounted, each caster having a pair of calipering members for engaging between them the margin of the blank being measured and a guide for engaging the side edge of the blank and controlling the path of the calipering members along the margin of the blank, and means yieldingly to press the two supports toward each other to hold the guides against the opposite side edges of the blank.

6. In a grading machine, a measuring mechanism comprising two independent swiveled calipering casters between which are passed the blanks to be measured, two supports movable toward and from each other on which the two casters are respectively mounted, each caster having a pair of calipering members for engaging between them the margin of the blank being measured and a guide for engaging the side edge of the blank and controlling the path of the calipering members along the margin of the blank, adjustable grading means, and setting mechanism, responsive to the measuring mechanism, adapted to govern the adjustment of the grading means in accordance with the thickness of the thinnest part of the blank as determined by either calipering caster.

7. In a grading machine, a measuring mechanism comprising two independent swiveled calipering casters between which are passed the blanks to be measured, two supports movable toward and from each other on which the two casters are respectively mounted, each caster having a pair of calipering members for engaging between them the margin of the blank being measured and a guide for engaging the side edge of the blank and controlling the path of the calipering members along the margin of the blank and means yieldingly to press the two supports toward each other to hold the guides against the opposite side edges of the blank, adjustable grading means, and setting mechanism, responsive to the measuring mechanism, adapted to govern the adjustment of the grading means in accordance with the thickness of the thinnest part of the blank as determined by either calipering caster.

8. In a grading machine, a measuring mechanism comprising two independent calipering casters, two supports movable toward and from each other on which the two casters respectively are pivotally mounted, and means for feeding blanks one at a time between said casters, each caster being individually operable to traverse and caliper only the adjacent side marginal portion of each blank independently of the middle portion and the opposite side marginal portion thereof and also independently of the other caster, and means yieldingly to press the two supports toward each other to hold the casters against the opposite side edges of each blank passing between the casters.

9. In a grading machine, a measuring mechanism comprising two independent calipering devices for acting respectively on opposite side marginal portions of a blank, adjustable grading means responsive to said measuring mechanism, two independent setting mechanisms controlled respectively by said two calipering devices, each including a ratchet adjusted in accordance with the thinnest part measured by the corresponding calipering device and a pawl for retaining the ratchet in adjusted position, and means to govern the adjustment of the grading means in accordance with the position of that one of the two setting mechanisms which is controlled by the calipering device which measures the thinnest part of the blank as determined by either of the two calipering devices.

10. In a grading machine, a measuring mechanism comprising two independent calipering devices for acting respectively on opposite side marginal portions of a blank, adjustable grading means responsive to said measuring mechanism, two independent setting mechanisms controlled respectively by said two calipering devices, each including a ratchet adjusted in accordance with the thinnest part measured by the corresponding calipering device, an abutment stop movable with each ratchet and a pawl for retaining each ratchet and stop in adjusted position, mechanism to adjust the grading means, and means to govern the adjustment of the grading means in accordance with the thinnest part of the blank measured by either calipering device including two stop members rigidly connected together and cooperating respectively with said abutment stops.

11. In a grading machine, a measuring mechanism comprising two independent calipering devices for acting respectively on opposite side marginal portions of a blank, adjustable grading means responsive to said measuring mechanism, two independent setting mechanisms controlled respectively by said two calipering devices and each including an adjustable stop, and mechanism for adjusting the grading means including a power transmission member, a spring for actuating said member, a detent normally holding said member in restraint against movement under the influence of said spring, a trip in the path of the blanks adapted to be actuated by each blank after it has been measured to disengage the detent and permit the spring to actuate said power transmission member until it is arrested in a position determined by one or the other of said two adjustable stops, and connections between the power transmission member and the grading means to adjust the latter in accordance with the position of the former.

12. In a grading machine, a traveling endless conveyor having a straight stretch by which blanks are propelled through the machine, a presser bar opposed to and parallel with said straight stretch, a pair of parallel arms of equal length, each pivoted at one end to the presser bar and at the other end to the frame of the machine, to permit the presser bar to swing away from the conveyor and in the direction of travel of the conveyor, and a spring yieldingly urging the presser bar toward the conveyor thereby to press the blanks against the conveyor as they pass between the conveyor and the presser bar.

13. A grading machine comprising calipering mechanism, grading mechanism, setting mechanism responsive to the calipering mechanism and controlling the grading mechanism and normally inoperative to preserve the grade measurements found by the calipering mechanism, a traveling endless conveyor at the delivery side of the calipering mechanism having a straight stretch by which blanks are propelled through the machine, a movably supported presser bar opposed to and parallel with said straight stretch, a spring yieldingly urging the presser bar toward the conveyor thereby to press the blanks against the conveyor, and a connection between the presser bar and the setting mechanism to render the setting mechanism operative to preserve the grade measurements, the presser bar also constituting a trip, the movement of which by the advance end of a blank starts the effective measuring of the blank.

14. A grading machine comprising calipering mechanism, grading mechanism, setting mechanism responsive to the calipering mechanism and controlling the grading mechanism and normally inoperative to preserve the grade measurements found by the calipering mechanism, a traveling endless conveyor at the delivery side of the calipering mechanism having a straight stretch by which the blanks are propelled through the machine, a presser bar opposed to and parallel with said straight stretch, a pair of parallel arms of equal length, each pivoted at one end to the presser bar and at the other end to the frame of the machine to permit the presser bar to swing away from the conveyor and in the direction of travel of the conveyor and in parallelism therewith, a spring yieldingly urging the presser bar in the opposite direction, and a connection between the presser bar and the setting mechanism to render the setting mechanism operative to preserve the grade measurements, the presser bar also constituting a trip, the movement of which by the advance end of a blank starts the effective measuring of the blank.

15. A grading machine comprising a calipering device, grading mechanism, setting mechanism responsive to the calipering device and controlling the grading mechanism and normally inoperative to preserve the grade measurements found by the calipering device, a trip in the path of the blank and connection between the trip and the setting mechanism to render the setting mechanism operative to preserve the grade measurements, the trip and the calipering device being relatively so positioned that both are engaged substantially simultaneously by the advance end of the blank, whereby the effective measuring of the blank will begin substantially at its extreme forward end.

16. A grading machine comprising a calipering device, grading mechanism, setting mechanism responsive to the calipering device and controlling the grading mechanism and normally inoperative to preserve the grade measurements found by the calipering device, a trip in the path of the blank and connection between the trip and the setting mechanism to render the setting mechanism operative to preserve the grade measurements, the trip and the calipering device being relatively so positioned that both are engaged substantially simultaneously by the advance end of the blank, whereby the effective measuring of the blank will begin substantially at its extreme forward end and means engaged by the advance end of the blank as it travels away from the calipering device for automatically ending the effective measuring of the blank.

17. A grading machine comprising calipering mechanism, grading mechanism, setting mechanism responsive to the calipering mechanism and controlling the grading mechanism and normally inoperative to preserve the grade measurements found by the calipering mechanism, a traveling endless conveyor at the delivery side of the calipering mechanism having a straight stretch by which blanks are propelled through the machine, a movably supported presser bar opposed to and parallel with said straight stretch, a spring yieldingly urging the presser bar toward the conveyor thereby to press the blanks against the conveyor, and a connection between the presser bar and the setting mechanism to render the setting mechanism operative to preserve the grade measurements, the presser bar also constituting a trip, the movement of which by the advance end of a blank starts the effective measuring of the blank, and mechanism for automatically ending the effective measuring of the blank including a trip in the path of the blanks to be operated by the forward end of each blank while it is passing forward between the conveyor and the presser bar.

18. A grading machine comprising measuring mechanism, adjustable grading means, setting mechanism responsive to the measuring mechanism and governing the adjustment of the grading means, a power transmission member for adjusting the grading means, feeding mechanism for feeding blanks toward the measuring mechanism, and connections from the feeding mechanism to the power transmission member and to the setting mechanism adapted to restore the same to their normal initial positions each time the feeding mechanism is operated.

19. A grading machine comprising measuring mechanism, adjustable grading means, setting mechanism responsive to the measuring mechanism and governing the adjustment of the grading means, mechanism for adjusting the grading means, including a power transmission member, a spring normally held under restraint for actuating said power transmission member and means operated by each blank after it has been measured to release the spring and power transmission member, feeding mechanism for feeding blanks toward the measuring mechanism, and means actuated by the feeding mechanism, each time the feeding mechanism is operated, to restore both the setting mechanism and the power transmission member to their normal initial position with said spring under restraint.

20. A grading machine comprising calipering mechanism, grading mechanism, setting mechanism responsive to the calipering mechanism and controlling the grading mechanism and normally inoperative to preserve the grade measurements found by the calipering mechanism, a traveling conveyor at the delivery side of the calipering mechanism, a movably supported presser bar adapted to hold the blanks against the conveyor, and a connection between the presser bar and the setting mechanism to render the setting mechanism operative to preserve the grade measurements, the presser bar also constituting a trip, the movement of which by the advance end of a blank starts the effective measuring of the blank, the front end of said presser bar being adjustable toward and from the calipering mechanism whereby the time when the effective measuring of the blank will begin with relation to its passage through the calipering mechanism may be varied.

21. A grading machine comprising calipering mechanism, grading mechanism, setting mechanism responsive to the calipering mechanism and controlling the grading mechanism and normally inoperative to preserve the grade measurements found by the calipering mechanism, a traveling conveyor at the delivery side of the calipering mechanism, a movably supported presser bar adapted to hold the blanks against the conveyor, and a connection between the presser bar and the setting mechanism to render the setting mechanism operative to preserve the grade measurements, the presser bar also constituting a trip, the movement of which by the advance end of a blank starts the effective measuring of the blank, said presser bar comprising two lengthwise adjustable sections, whereby the presser bar may be lengthened or shortened to vary the time when the effective measuring of the blank will begin with relation to its passage through the calipering mechanism.

22. A grading machine comprising a calipering device having a pair of opposed calipering members adapted to traverse and caliper only the marginal portion of the blank being measured, a guide for engaging the side edge of the blank to cause the calipering member to follow the contour of said side edge, and means to adjust the guide toward and from the calipering members to shift the path of travel of the calipering members toward and from the edge of the blank.

23. In a grading machine, a measuring mechanism comprising two calipering devices between which are passed the blanks to be measured, each of said calipering devices being individually operable to traverse and caliper only the adjacent marginal portion of each blank independently of the other calipering device, each calipering device having calipering rollers and a guide for engaging the adjacent side edge of the blank being measured, means to adjust the guide toward and from the calipering rollers to shift the path of travel of the calipering rollers toward and from the edge of the blank, and means to hold the guides against the opposite side edges of the blank as the blank passes between the calipering devices, whereby the calipering devices are caused to follow the contours of the side edges of the blank.

24. A grading machine comprising measuring mechanism including two independent swiveled calipering devices for acting respectively on opposite side marginal portions of a blank, adjustable grading means responsive to said measuring mechanism, two independent setting mechanisms controlled respectively by said two calipering devices, and means to govern the adjustment of the grading means in accordance with the position of that one of the two setting mechanisms which is controlled by the calipering device which measures the thinnest part of the blank as determined by either of the two calipering devices.

25. A grading machine comprising measuring mechanism, adjustable grading means, setting mechanism, responsive to the measuring mechanism, including an adjustable stop adapted to govern the adjustment of the grading means, and mechanism for adjusting the grading means including a power transmission member, a spring for actuating said member, a detent normally holding said member in restraint against movement under the influence of said spring, a trip in the path of the blanks adapted to be actuated by each blank after it has been measured to disengage the detent and permit the spring to actuate said power transmission member until arrested in a position determined by said adjustable stop of the setting mechanism, and connections between the power transmission member and the grading means to adjust the latter in accordance with the position of the former.

26. A grading machine comprising measuring mechanism, adjustable grading means, setting mechanism, responsive to the measuring mechanism, including an adjustable stop adapted to govern the adjustment of the grading means, and mechanism for adjusting the grading means including a power transmission member, a spring for actuating said member, a detent normally holding said member in restraint against movement under the influence of said spring, a trip in the path of the blanks adapted to be actuated by each blank after it has been measured to disengage the detent and permit the spring to actuate said power transmission member until arrested in a position determined by said adjustable stop of the setting mechanism, and connections between the power transmission member and the grading means to adjust the latter in accordance with the position of the former, and means for automatically resetting said power transmission member and spring to normal position upon the removal of each blank from the machine.

27. In a grading machine, a measuring mechanism, two independent calipering casters, two supports movable toward and from each other on which the two casters respectively are pivotally mounted, and means for feeding blanks one at a time between said casters, each caster being individually operable to traverse and caliper only the adjacent side marginal portion of each blank independently of the middle portion and the opposite side marginal portion thereof and also independently of the other caster.

28. In a grading machine, a measuring mechanism including two independent calipering casters, two supports movable toward and from each other on which the two casters respectively are swiveled, each caster having a pair of calipering members for engaging between them the margin of the blank being measured and a pair of guide members on each caster positioned one in advance and one to the rear of the nip of the calipering members for engaging the side edge of the blank and guiding the calipering members along the margin of the blank.

29. In a grading machine, a measuring mechanism comprising two independent swiveled calipering casters between which are passed the blanks to be measured, two supports movable toward and from each other on which the two casters are respectively mounted, each caster having a pair of calipering members for engaging between them the margin of the blank being measured and a pair of guide rollers, one guide roller in advance of and one at the rear of the calipering members, for engaging the side edge of the blank and controlling the path of the calipering members along the margin of the blank, and means yieldingly to press the two supports toward each other to hold the guide rollers against the opposite side edges of the blank.

30. In a grading machine, a measuring mechanism including a pair of supporting arms pivoted to swing laterally toward and from each other, a calipering caster comprising a frame swiveled on a vertical axis at the end of each supporting arm, a pair of calipering members carried by each swiveled frame for engaging between them the margin of the blank being measured and guiding means on each swiveled frame for engaging the edge of the blank and controlling the path of the calipering members along the margin of the blank.

31. In a grading machine, a measuring mechanism including a pair of supporting arms pivoted to swing laterally toward and from each other, a calipering caster comprising a frame swiveled on a vertical axis at the end of each supporting arm, a pair of calipering members carried by each swiveled frame for engaging between them the margin of the blank being measured and guiding means on each swiveled frame for engaging the edge of the blank and controlling the path of the calipering members along the margin of the blank, and means yieldingly to press the arms toward each other to hold the guiding means against the opposite side edges of the blank.

32. In a grading machine, a measuring mechanism including a pair of supporting arms pivoted to swing laterally toward and from each other, a calipering caster comprising a frame swiveled on a vertical axis at the end of each supporting arm, a pair of calipering rolls carried by each swiveled frame for engaging between them the margin of the blank being measured and a pair of guide rollers on each swiveled frame, one guide roller in advance of and one at the rear of the calipering rolls, for engaging the side edge of the blank and controlling the path of the calipering rolls along the margin of the blank.

33. In a grading machine, a measuring mechanism comprising two calipering devices between which are passed the blanks to be measured, each of said calipering devices being individually operable to traverse and caliper only the adjacent marginal portion of each blank and each of said calipering devices being bodily movable laterally toward and from the blank and also swiveled to adjust itself to the edge contour of said edge independently of the other calipering device, and means through which said calipering devices control the action of other mechanism of the machine according to a thickness characteristic of the blank detected by either calipering device.

34. In a machine of the class described, a pair of independently pivoted arms, measuring devices carried by said arms and swiveled relatively to said arms when contacted by a moving blank, and means for swinging said arms on their pivots independently one of the other as the contour of said moving blank changes, said means being operated by the contour of said blank.

35. In a machine of the class described, a pair of pivoted arms, measuring rolls mounted for vertical movement relatively to said arms and adapted to have measuring movement when contacted by a moving blank, means contacting the periphery of the blank for moving the arms on their pivots as the contour of the blank changes whereby said rolls may follow the edge contour, and means whereby said rolls swivel relatively to said arms on an axis parallel to the axis of rotation of said pivoted arms whereby they may more accurately follow the blank contour.

36. In a machine of the class described, measuring rolls adapted to contact a blank to be gauged, means supporting said rolls for measuring movement in an axis perpendicular to the plane of the blank, adjustable grading means actuated by said rolls in said movement, and means whereby said rolls swivel relatively to said supporting means in an axis perpendicular to said blank so as to follow the edge contour of the blank.

37. In a machine of the class described, measuring rolls adapted to contact a blank to be gauged, means supporting said rolls for vertical measuring movement as the thickness of the blank varies, and means whereby said rolls swivel on a vertical axis relatively to said supporting means so as to vary the directional position of said rolls relatively to said supporting means.

38. In a machine of the class described, measuring rolls adapted to contact a blank to be gauged, means supporting said rolls for vertical measuring movement as the thickness of the blank varies, and mounting means for said rolls whereby said rolls swivel on a vertical axis relatively to said supporting means so as to vary the directional position of said rolls relatively to said supporting means.

39. In a machine of the class described, measuring rolls adapted to contact a relatively moving blank to be gauged, mounting means mounting said rolls for vertical movement relatively to said blank as the thickness of said blank varies, means mounting said rolls for swivelling relatively to said mounting means on an axis vertical relatively to said blank, and means operable in response to the contour of the edge periphery of the blank whereby said rolls are swivelled to assume various directional positions relatively to their mounting means.

40. In a machine of the class described, measuring rolls adapted to contact a blank to be gauged, mounting means mounting said rolls for vertical movement relatively to said blank as the thickness of said blank varies, means controlled by the edge periphery of the blank mounting said rolls for swivelling relatively to said mounting means on an axis vertical relatively to said blank, means for moving said roll mounting means laterally relatively to said blank as the contour of the blank periphery changes, said lateral movement of the roll mounting means being effective to cause swivelling of the rolls when said rolls are in contact with the blank so as to change their directional positions to conform to the particular contour then effecting the movement of said mounting means.

41. In a machine of the class described, a measuring arm adapted for horizontal swinging movement about a vertical pivot, a measuring roll carried by said measuring arm and adapted to move vertically relatively thereto when contacted by a moving blank of varying thickness, and means whereby said measuring roll may swivel relatively to said arm on a pivot parallel to the pivot of said arm while moving bodily with said arm about its pivot.

42. In a machine of the class described, a measuring arm adapted for horizontal swinging movement about a vertical pivot, a measuring roll carried by said measuring arm and adapted to move vertically relatively thereto when contacted by a moving blank of varying thickness, means whereby said measuring roll may swivel relatively to said arm on a pivot parallel to the pivot of said arm while moving bodily with said arm about its pivot, and means for swinging said arm horizontally on its pivot in response to the changing contour of the moving blank to be measured.

43. In a machine of the class described, a measuring roll adapted to contact a blank to be measured, a member on which said roll is mounted, means whereby said roll may swivel relatively to said member on a particular axis but is movable integrally therewith in a vertical direction upon variations in the thickness of the blank, a pivoted measuring lever connected to said member and arranged to be moved by said member and the measuring roll, and means for guiding said member for movement so as to keep said swivel axis perpendicular relatively to the plane of the blank.

44. In a machine of the class described, a measuring roll adapted to contact a blank to be measured, a member on which said roll is mounted, means whereby said roll may swivel relatively to said member on a particular axis but is movable integrally therewith in a vertical direction upon variations in the thickness of the blank, a pivoted measuring lever connected to said member and arranged to be moved by said member and the measuring roll, and means for guiding said member for movement so as to keep said swivel axis perpendicular relatively to the plane of the blank while permitting the member to move with the pivoted measuring lever.

45. In a machine of the class described, a pair of horizontally swinging arms mounted for swinging about a vertical axis, measuring rolls and means mounting said rolls on said arms on vertical axes parallel to the axes of said arms whereby said rolls may swivel on said vertical axes relatively to said arms.

46. In a machine of the class described, a pair of measuring levers, means mounting said levers for vertical measuring movement and for horizontal swinging movement, measuring rolls adapted to contact a moving blank to be measured, means connecting said rolls to said levers for moving the levers vertically in accordance with the thickness of said blank, and means mounting said rolls for free swivelling movement on a vertical axis relatively to said levers, while moving said levers in accordance with the thickness of said blank.

JAMES W. JOHNSTON.